US008566128B2

(12) United States Patent
Koziol

(10) Patent No.: US 8,566,128 B2
(45) Date of Patent: Oct. 22, 2013

(54) INSURANCE TRANSACTION SYSTEM AND METHOD

(76) Inventor: Joseph D. Koziol, Bedford, NY (US)

( * ) Notice: Subject to any disclaimer, the term of this patent is extended or adjusted under 35 U.S.C. 154(b) by 189 days.

(21) Appl. No.: 13/274,618

(22) Filed: Oct. 17, 2011

(65) Prior Publication Data
US 2012/0041790 A1 Feb. 16, 2012

Related U.S. Application Data

(63) Continuation-in-part of application No. 12/257,476, filed on Oct. 24, 2008.

(60) Provisional application No. 60/982,222, filed on Oct. 24, 2007.

(51) Int. Cl.
G06Q 40/00 (2012.01)
G06Q 40/08 (2012.01)
G06Q 40/06 (2012.01)

(52) U.S. Cl.
CPC .............. G06Q 40/08 (2013.01); G06Q 40/06 (2013.01)
USPC ............................................ 705/4; 705/36 R

(58) Field of Classification Search
CPC ....... G06Q 40/08; G06Q 50/22; G06Q 40/00; G06Q 50/24; G06Q 40/02
USPC ................ 705/4, 35, 36 R; 235/379
See application file for complete search history.

(56) References Cited

U.S. PATENT DOCUMENTS

| 4,346,442 | A | 8/1982 | Musmanno | |
| 4,376,978 | A | 3/1983 | Musmanno | |
| 4,597,046 | A | 6/1986 | Musmanno et al. | |
| 4,674,044 | A | 6/1987 | Kalmus et al. | |
| 4,700,297 | A | 10/1987 | Hagel, Sr. et al. | |
| 4,774,663 | A | 9/1988 | Musmanno et al. | |
| 4,953,085 | A | 8/1990 | Atkins | |
| 5,270,922 | A | 12/1993 | Higgins | |
| 5,671,363 | A | 9/1997 | Cristofich et al. | |
| 5,987,435 | A | 11/1999 | Weiss et al. | |
| 6,513,020 | B1 | 1/2003 | Weiss et al. | |
| 7,249,038 | B2 * | 7/2007 | Luedtke | 705/4 |
| 7,461,007 | B2 * | 12/2008 | Lundegren | 705/4 |
| 7,885,835 | B2 * | 2/2011 | Amigo et al. | 705/4 |
| 8,135,600 | B2 * | 3/2012 | Amigo et al. | 705/4 |
| 8,175,899 | B2 * | 5/2012 | Becerra et al. | 705/4 |
| 8,401,879 | B1 * | 3/2013 | Kazenas | 705/4 |
| 2002/0032586 | A1 * | 3/2002 | Joao | 705/4 |
| 2004/0122697 | A1 * | 6/2004 | Becerra et al. | 705/1 |
| 2004/0260578 | A1 | 12/2004 | Jin | |
| 2007/0055553 | A1 | 3/2007 | Kwan | |
| 2007/0282641 | A1 * | 12/2007 | Thomas et al. | 705/4 |
| 2011/0161100 | A1 * | 6/2011 | Peak et al. | 705/2 |
| 2012/0265559 | A1 * | 10/2012 | Colagiovanni, Jr. | 705/4 |

OTHER PUBLICATIONS

Rutkin et al., "Understanding Multiple Insurer Situations", 2009, Matthew Bender & Company, Inc.*
Wells, Bert "Excess Insurance, Umbrella Insurance and Multi-Insurer Coverage Programs", Jan. 4, 2010.*
Yin Tung "Nailing Jello to a Wall: A Uniform Approach for Adjudicating Insurance Coverage Disputes in Products Liability Cases with Delayed Manifestation Injuries and Damages" 1995, California Law Review, Inc.*

(Continued)

Primary Examiner — Ryan D Donlon
(74) Attorney, Agent, or Firm — Robert M. Schwartz; Kerry P. Sisselman

(57) ABSTRACT

The present invention is a system and method of creating insurance with a switching device that limits the liability of the insurer.

34 Claims, 13 Drawing Sheets

Illustrative System
Interaction with computers, workstations, networks and databases

(56) References Cited

OTHER PUBLICATIONS

Alden, William, Man Makes Ridiculously Complicated Chart to Find Out Who Owns His Mortgage (CHART), http://www.huffingtonpost.com/2010/11/16/mortgage-security-chart_n_784274.html.

"Just When You Thought You Knew Something About Mortgage Securitizations", http://www.zerohedge.com/print/248930.

Case, Karl E., Shiller, Robert J and Weiss, Allan N., "Index-Based Futures and Options Markets in Real Estate", Cowles Foundation Abstract, Dec. 1991.

EquityLock Solutions Website, http://equitylocksolutions.com/faq.

Hemenway, Chad, "International Regulator Report Says Insurance Poses No Systemic Risk", http://www.propertycasualty360.com/2011/11/17/international-regulator-report-says-insurance-pose, Nov. 17, 2011.

Case, Karl E., Shiller Robert J., and Weiss, Allan N., "Index-Based futures and Options Markets in Real-Estate", The Journal of Portfolio Management, pp. 83-92 (Winter 1993).

Jenny Hope, Plan that eases women's worries; Daily Mail. London (UK): Nov. 3, 1999, p. 62.

Shiller, Robert J., "Recession Insurance", http://www.project-syndicate.org/commentary/shiller62/English.

Shiller, Robert J., "Insuring Against Insurance," http://www.turkishweekly.net/print.asp?type=1&id=55697, Wednesday, May 28, 2008, Turkish Weekly.

Shiller, Robert J. and Weiss, Allan N., "Home Equity Insruance", Cowles Foundation Discussion Paper 1007 (2000), http://cowles.econ.yale.edu/.

Williamson, Elizabeth, "Dems Seek to Nationalize Hurricane Insurance", May 31, 2008, http://www.liveleak.com/view?i=a50_1212278321.

Koziol, Joseph D., "A Handbook for Professional Futures and Options Traders", John Wiley & Sons, Inc. 1987, pp. 243-245 and 259-262.

Koziol, Joseph D., "Hedging: Principles, Practices & Strategies for the Financial Markets", John Wiley & Sons, Inc. 1990, pp. 213-218.

\* cited by examiner

Figure 1. Illustrative hedging progression

Hedging: none → passive → dynamic → active → proactive

Figure 2. Analogies example 1

Acid → Neutral → Alkaline        pH scale

Acid → Neutral ← Alkaline    Another perspective of pH scale

Figure 3. Analogies example 2

Principal only → mortgage-backed security ← interest only

Principal only ← mortgage-backed security → interest only

Altering risk, reward, and durations profile.

Figure 4. Simple Scripts $A_{ij}$ × $B_{ij}$ = $Z_{ij}$

These are subscripts.

Figure 5. Complex Scripts $$A_{ij}^{ij} \times B_{ij}^{ij} = Z_{ij}^{ij}$$

These are subscripts and superscripts.

Figure 6.1. Static View

Macroeconomic

M
i
c
r
o
e
c
o
n
o
m
i
c

Snapshot of macroeconomic and microeconomic variables.

Figure 6.2. Dynamic View
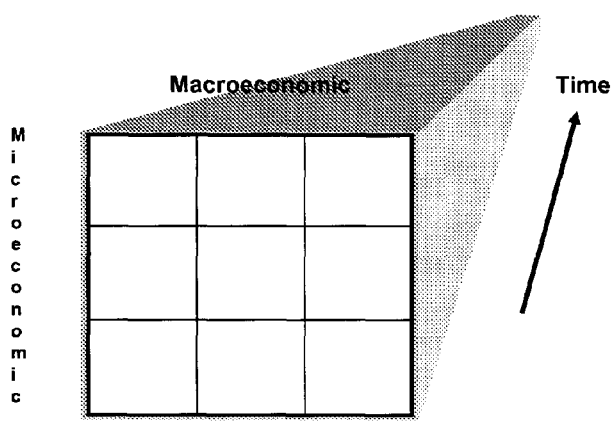
Macroeconomic and microeconomic variables moving in time.

Figure 7.1. Static View
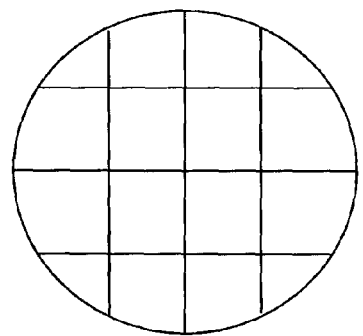
Snapshot where parameters and risks are not always square.

Figure 7.2. Dynamic View
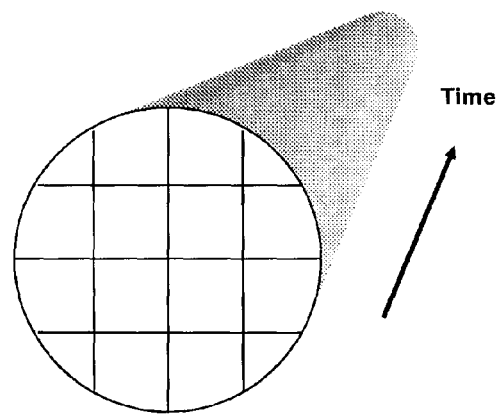
Where parameters and risks are not always square in time.

Figure 8.1. Variables or risks seem flat
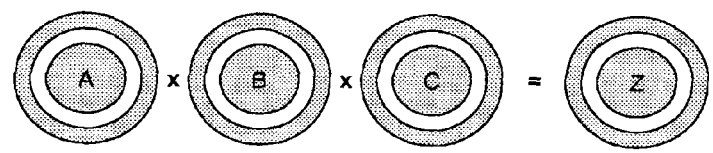
Variable perspective #1. Apparently flat.

Figure 8.2. Variables or risks are not flat
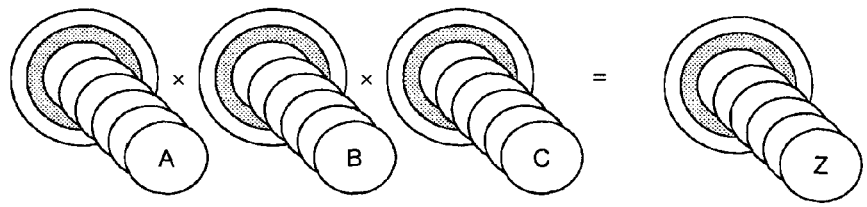
Variable perspective #2. Not flat but layered, tiered or multi-leveled.
Each layer, level or tier requires its own scripts.

Figure 9. Illustrative System
Interaction with computers, workstations,
networks and databases
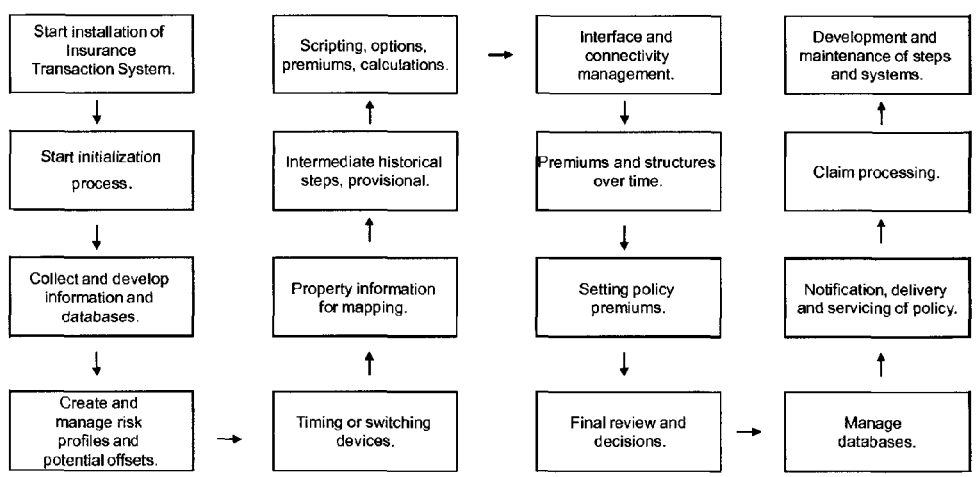

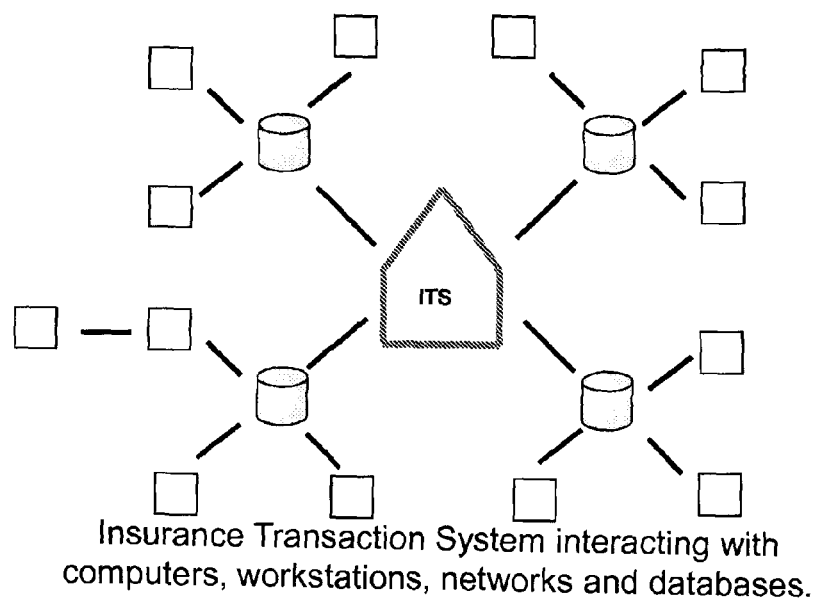
Figure 10. System
Insurance Transaction System interacting with computers, workstations, networks and databases.

INSURANCE TRANSACTION SYSTEM AND METHOD

INDEX TO RELATED APPLICATIONS

This application is a Continuation-in-Part of U.S. patent application Ser. No. 12/257,476 filed on Oct. 24, 2008, and entitled Insurance Transaction System and Method, which claims the benefit of U.S. Provisional Patent Application No. 60/982,222, filed Oct. 24, 2007, the disclosures of which are incorporated herein, by reference, in their entireties.

FIELD OF INVENTION

This new insurance space and system are products, methods, processes, and mechanisms for protecting real estate interests, liquid and illiquid assets and liabilities, virtual properties, organic and inorganic properties, synthetic properties, positional properties, positioning, securitized properties and other properties. A corresponding data processing, analysis, and management system that interfaces with various databases and systems, generates insurance inquiry and proposal forms, generates policy documents, and generates various business, such as, risk management reports and analyses. Also, the architecture of the invention facilitates reinsurance and hedging operations and instruments for multiple product lines.

The present invention, including the concepts, products, methods, processes, mechanisms, applications and technologies jointly and severally that enable individuals, partnerships, corporations, governments, non-profit organizations and other entities to risk manage various assets and liabilities from a market value aspect. This market value aspect was lacking in the insurance area especially for macroeconomic events that influenced various properties and rights. This is true despite that some policies state, "market value or replacement cost" after any adjustments. In previous insurance policies, the damage tended towards or had to be physical and it was basically microeconomic. Even when hurricanes or other disasters occurred, some properties may have little or no damage. Nevertheless, the overall cluster or area has been damaged. This broader market value damage has a negative impact on the relatively sound property.

While there are various financial instruments such as futures, options, forwards and other derivative products these financial instruments have different suitability requirements for usage. Some of these financial products require relatively high degrees of sophistication and skill to apply. In fact, margin accounts are necessary for some of these risk management or hedging products and programs. That is not the case for the purchase of insurance coverage.

The insurance system and method of the present invention can be used separately or in conjunction with other insurance products, including but not limited to typical homeowners, commercial, or vehicle coverage. It can be transacted within a single insurer group or across insurers. Depending on the depth and scope of acceptance the overall insurance system and method and space performs best across time.

The insurance system and method has space that makes initialization usage of existing insurance data, methods and systems but then transforms the process by a system in a novel manner.

BACKGROUND OF THE INVENTION

The insurance system and method defines at least one class having novel insurance concepts, products, methods, processes, techniques, applications, mechanisms including pricing, and the technologies that either singular or plural in usage modify or neutralize risks. These new products may be renamed with other brands depending on marketing, licensing and other business factors. The class is separate and distinct from the initial insurance system and method that identified, defined, and presented new securities that were standalone and yet could be used as the basis for futures, options, forwards and other derivative products. The original insurance system and method securitization and model for derivative products spanned the spectrum of illiquid to liquid properties.

Among the key distinctions between the insurance class of the present invention and the initial system securities class are the methods, pricing, taxation, suitability requirements, account opening and maintenance, risk transformation and risk transference and especially the ability to protect the market value of the designated item with an insurance product that is available for purchase by a premium payment. The system creates products within complex spaces that are comparatively user friendly and understandable particularly from the property owner's perspective. Payment of premium buys coverage.

Traditional insurance products provide the owner or beneficiary with a payment upon the occurrence of an insurable event. The common cost of the policy coverage is the premium. The policy has various declarations, insurable limits, term or maturity, deductibles and other language specific to the insured party and its contract or policy. When the claim is approved then the proceeds may be paid as a lump sum, in annuity form, or other contractual design. Until now, insurance generally addressed physical structure, land via environmental or contaminant claims, property, casualty, health, and life. Other policies addressed Errors and Omissions, or some definable potential liability. Insurance has not been available for financial and economic impacts such as swings in real estate values, particularly on a broad scale. This insurance space covers that as well.

Virtual real estate consists of space that may have trademarks, selling marks, copyrights, various content, domain names, special URLs, patents, trade-secreted processes and algorithms, traffic patterns and positioning. While each of these elements may have value, the potential value of the space may exceed that of a simple summing of the parts. Using a physical analogical example, a single-corner square-lot retail store literally has twice the exposure compared to a similarly dimensioned inside lot.

Another aspect of this positioning is the ranking or listing order of search engine results. It is generally accepted that the higher the ranking, the more valuable the property. Another is the synergistic space that is created and defined by not only separately by the above but also by a multiplicative manner.

The underwriting process for traditional insurance is different than the underwriting process for a security. The underwriting process for insurance is akin to assessing the insurability of the person or property and then offering a policy to the private policyholder. In fact, depending on the circumstances insurance coverage may be required or mandated. There is no similar requirement or mandate for investing. Underwriting for securities involves securitizing some property or entity and then selling shares, bonds, or other financial instruments to the public or sophisticated and/or accredited investors. The selling process in securities and derivatives is governed more by suitability, not insurability.

In the United States, taxation is different depending on products and jurisdictions. Most insurance claim payments are not taxable. This is not the case for securities and derivatives. Profits may be taxable as either long-term or short-term capital gains. Sometimes mark-to-market procedures or the given instrument itself can generate phantom income and a tax liability. It is a complex area. It is so for hedging or risk management operations too.

Nevertheless, in a typical derivative products or security short sale as a hedge, there may be identical, partial, or diverging movements. These depend on the basis, spread or swaps movement. The first two conditions provide relative degrees of offset; the latter condition does not provide this.

The 403(B) retirement plan may provide some downside protection to the participant. Here, the portfolio of investments (one or multiple) may have put-like protection on the cash contribution. This annuitized form of plan does not generally show the cost of this put option feature. It is implicit. The system and method of the present invention goes beyond that to explicit premiums, defined coverage. Subsequently, one can calculate the cost of a policy in the present system and method according to the invention to that of plain homeowner's coverage, and again the cost of a policy according to the present invention to a bundled policy. While the cost then seems implicit, one can still calculate the differentials. Depending on the plan, upon the death of the participant the proceeds would be the greater of the actual market value or the cash contribution. This is another difference between the invention and other products.

Hedging or risk management focuses on providing protection by controlling positions that offset one another according to various degrees. Therefore the ongoing risk management and investment process can acquire and/or require new instruments.

If a property is damaged by wind, water, hail, earthquake, fire, or other insurable event then there is a payment to the insured for the amount determined by the claim adjuster or some other party. That claim payment is not income. There are some existing derivative products in real estate that may generate taxable consequences. However, nearby properties that have little or no physical damage are still influenced by the economic damage. To make this point even clearer, consider a condominium, apartment building, or multiple family dwelling. If even one unit is damaged the whole suffers. This negative effect is magnified by more damaged units. Dramatically, if you owned the only unit that was unscathed, you would be damaged but unable to file a claim until now.

Again, an analogy is useful. If there is a fire in a neighborhood then the house that burned may have some recourse or recompense due to policy claim payment. Without a rebuilding or restoration, the damaged property continues to impair neighborhood or local values. With or without rebuilding, the physically damaged property owner was made financially whole. This was not necessarily the case for the neighbors.

Similarly, for a commercial property there may have been water or flood damage for all the floors below a property holder's floor. Nevertheless, the strata of flood or water damaged floors has a negative impact on the physically undamaged floor or floors.

Another variation but not the final variation or limiting variation is land contamination. This contamination can be polluted water, wells, aquifers, or chemical, biological or radiological contaminants, the dumping of refuse and so forth. If a property is in the area, vicinity or otherwise proximate to the fouled environment, then that seemingly unharmed property has actually been damaged.

SUMMARY OF THE INVENTION

This new insurance according to the present invention are products, methods, processes, mechanisms, systems, and technologies for protecting real estate interests, leases, leaseholds, subleases, liquid and illiquid assets, virtual properties, spatial properties, synthetic properties, organic and inorganic properties, securitized properties as well as other properties and rights.

The insurance according to the system and method of the present invention applies to residential, commercial, educational, recreational, governmental, and non-profit usages.

Some of these properties and/or right are or are related to: schools, medical facilities, government buildings and properties, single-family dwellings, multiple family dwellings, mixed use facilities, casinos, nursing homes, assisted living facilities, factories, storage facilities, warehouses, power stations and substations, cell phone towers, satellites and other craft and/or the positions and orbits, museums, harbors, airports, terminals, transportation routes such as: airline, train, bus, ferry, barge, shipping; franchises, landfills, quarries, reservoirs, springs, wells, golf courses, water parks, movie theaters, restaurants and other eating establishments, stadiums, arenas, sports centers, waste management sites, campgrounds, mobile homes, trailer parks, farms, ranches, forests, undeveloped land or property, partially developed land or property, fully developed land or property, synthetic properties, virtual or cyberspace properties, organic and inorganic properties, and so on.

Among the previous obstacles, hindrances, and apparently intractable problems were how to transform an intermediate, mega, or macroeconomic risk into a manageable microeconomic risk form. It requires special processes, methods, and technologies that were previously lacking. How much does it cost? Or, better still how can the insurer provide this coverage in an economical and efficient manner? And how can the potential insured buy this coverage at a comparatively reasonable premium? The few derivatives that are recently available are quite to very expensive to use particularly in option form, not heterogeneous, and not insurance products. This invention provides solutions.

A major problem is real estate markets in all their forms and formulations that are subject to market or price risk. Anxiety about what will happen to a property's value after purchase may be enough to preclude a transaction and on a broader scale, reduce the number of transactions. In the event that a transaction does occur substantial loss may occur on a re-sale or other conveyance. Moreover, a reduction in the number of transactions suggests reduced liquidity and wider pricing or transaction pricing spreads and costs. This problem generates other problems that are not just limited to simple efficiencies. It inhibits business flows, job mobility, the transition from working to retirement, and other lifestyle concerns. Similarly, it impacts business relocation or new location opportunities. These events impact real estate usage, labor, capital and even technology.

The insurance system and method of the present invention has a class that mitigates the financial anxiety and the financial impact about buying real estate or executing other property transactions. This is especially true given that many properties including but not limited to commercial, residential, or non-profit are funded by cash and borrowed monies. Therefore it functions not only within its own area of interest but also within the capital markets, debt and equity, assets and liabilities, and derivatives.

Complementary to the process, products, pricing, and system is the creation of new instruments to layoff or reinsure different risks. These instruments are based on policy pools. The instruments represent Bundled Underlying New Transaction Securities that can be benchmarked, indexed, and/or partitioned. These securitized interests can also be the basis for derivative products. This completes the separate and different processes. First, the insured acquires novel coverage for market risk. Then the insurer can manage the new insurance risk via new instruments or reinsurance programs. These new instruments or securities are situationally engineered.

Included but not limited to other properties are personal or commercial properties, motor vehicles, planes, ships, yachts, hovercraft, and other watercraft, satellites and other spacecraft, sculptures, paintings, antiques, shares in a co-op or co-operative, and other collectibles, unique or otherwise. Some of these may be considered chattels or personal. For example, some yachts are used as floating art and collectible galleries. There is a value apart from the jewels, paintings and sculptures. It is the market leadership and arrangement market value component. Again by analogy, people have value but relatively few have that celebrity or star value market value component. Likewise, internet sites have value but the range in valuations is extreme. Therefore, many if not most are "commodities" whereas the remainder is special.

These insurable properties may be on the land, below the land, above the land, or exist virtually or synthetically, all without limitation. For example, different satellite imaging, positioning, and communication devices have locations above the earth's surface. This basic satellite then may transmit, receive, interact, or control; and be available to sell, lease, or license different waves or bandwidths of the spectrum. While the satellite may be covered for damage due to collision with space junk, launch failure, systems failure and the like, it is its location that has a uniqueness or special spatial aspect. Lose that location and you can disrupt a network and lose market value. Likewise, a cell tower may have physical insurance coverage. However, that property in total or partitioned may become more valuable due to zoning laws and lack of competition; or, it can become less valuable due to new and emerging technologies. For various claims of possession, as well as the preservation or appreciation of capital, investment and market value, the "space" has to be occupied and/or used to maintain possession, ownership or pre-existing usage rights.

There are intellectual properties such as copyrights, trademarks, trade secrets and patents. These have value. Many businesses are dependent on this intellectual capital. For some, it is their business model and activity. Transactions in these properties entail market risk. If one purchases these properties, they are exposed to market risk. For example, if one buys a brand or trademark there is risk. If they borrowed money to purchase the brand or trademark, there is leveraged (levered, geared) risk. If they buy a company that contains this intellectual property, then there is the company market risk. Within that corporate risk one or more intellectual properties start to sum up to the enterprise's valuation. There is insurance coverage for the select items either individually or collectively as a portfolio. However, this invention addresses the market value of the space creation particularly from a virtual or cyber space object. As an analogy, one can buy flowers individually however a good arrangement of those flowers commands a higher price or added market value. In fact, there is at least one museum that requires its contents, the works, to be specifically shown in a given arrangement.

In accounting, goodwill represents the value beyond the basic recording of assets and liabilities. It quantifies the momentary financial extra of a transaction.

There is a multitude of risks facing the potentially insured and the potential insurers. Depending on the defined coverage, these risks are then transferred when a policy is written. Market value risk starting with real estate properties and rights is now coverable.

There are securitized properties such as companies, franchises, or shares in co-operatives and the individual units. These can be real estate based and have market risk or value exposure.

Moreover, there are different forms of "real estate" or "space". Traditionally, real estate had the land, structure, minerals, water, air and other rights. These rights pertained to a physical reality. These rights could be conveyed separately, bundled, or in total. Now websites, domain names, specific URLs, content, brands and other factors drive internet, online or cyberspace transactions, education, leisure, entertainment and travel. These are defining particulars of cyberspace or virtual real estate. Often trade-secreted algorithms provide an edge, perhaps the dominant edge, for search engines and other online sites. The complexity of these intertwined even linked items influences market value. There are jurisdictional market value aspects. The insurance system and method of the present invention has coverage that enables parties to cope with these matters now.

For example, if one buys a domain name for a substantial sum then the buyer is confronted with financial and economic risk. If the purchase used borrowed money then the transaction was leveraged and the risk magnified.

Whether here or elsewhere, the failure to rebuild, restore, reoccupy or use certain sites, locations and usages particularly within statutory or even common law may result in diminished market value, loss or even forfeiture.

Depending on context, pools can be bodies of water, groups of mortgages underlying mortgage-backed securities, an insurance group, buyers and sellers, clusters or assignments to a particular risk class or other uses.

Insurance, investment and risk management utilize the principles of portfolio theory and diversification. Simply stated there are: Systematic and unsystematic risks. Systematic risks approximate the market whereas unsystematic risks approximate the individual components.

Unsystematic risks are those that can be diversified away by including individual parties, particularly non-correlated ones. Essentially, this approach diffuses or dilutes many comparatively low risk occurrences across a wide and deep pool. It is predicated on the proposition and expectations that negative occurrences will happen but not across the board at the same time for many, most, or all participants. There is also an assumption of statistical independence among the parts. This is oppositional to macroeconomic or mega events that impact many, most or all at the same time or within a relatively narrow time frame.

Systematic risks are a major problem for market-wide, mega or catastrophic events, factors or variables. Systematic risks are those endemic to a system, group, cluster, insurance pool or base of policyholders. These systematic risks cannot be readily diminished by simple diversification. They can be addressed by various hedging techniques, instruments, and now a method.

Another feature is the creation of new class of risk securities, insurance securities, and other instruments. Risk profiles that are identified then can remain or be modified by the risk manager and, perhaps, be sold, bought or otherwise transferred to others.

A significant new dimension is the temporal methodology and management in terms of timing the offering of policies and the accepted coverage. When you are dealing with relatively small independent or individual risks the preferred technique is rapid or instantaneous diversification. This is a feature for many index funds. These funds try to place as many positions in a very short time frame because they are evaluated in terms of performance and tracking the benchmark, basis, or stipulated index. In other words, it has been a guiding principle to deploy multiple investments or sign up new policies right away. That way the insurer, investment or risk manager has a broad and deep pool of policyholders. However, that is problematical for essentially nondiversifiable risks. The reason is that adding additional policies does not diminish the risk from the insurer's perspective. In fact, the more policies that are immediately signed up subjects the insurer to greater cumulative risk. This greater insurer cumulative risk then subjects the insured to greater risk. There is an increased likelihood that the insurance company will not have adequate funds/reserves to pay all claims fully. This is because when mega or macroeconomic events occur, the claims tend to come all at once and not dispersed as random individual occurrences. Consequential government intervention in case of insurer failure, only results in the liability being passed to others on an involuntary non-risk adjusted basis.

Augmenting the process is a phasing in, skipping, or staggered acceptance of new policies. This dimension parses and diversifies the entries and participants across time. This methodology can be standalone and is inventive in its own right. Combined with the other methods, products, mechanisms and system it creates a superior insurance space. In other words, the insurer does not bear the non-diversified macroeconomic risk for all insured parties for all the time particularly at the beginning. Unlike traditional policies, where it would be extremely remote that all the houses or commercial properties burned down at the same time; it is quite likely that a macroeconomic or mega event influences many, most or all at the same time. Mega disasters such as hurricanes impact large areas with the brunt of the storm borne by coastal regions. Applying traditional insurance methods has not been satisfactory.

Financial and macroeconomic events cast long shadows over regional and national economies. Depending on the relative size of a regional economy within a national economy and a national economy within the global economic framework, significant effects can occur on an interdependent basis as well as on a dependent basis.

Until now, insurance or immunization has been a one-method fits all approach. Generally, until this invention the approach of adding policies for all risks was signup as many policies as quickly as possible. Yet depending on the type of risk, one disaster could impair or preclude the insurer's ability to payoff claims.

Optimizing the cost of providing and the cost of purchasing this insurance is a novel application of various option pricing models and approaches. Depending on venue of purchase, provision and usage, there may or may not be regulatory issues. Regardless, this does not invalidate the insurance space, methodologies, and system.

Insurance has many models or structures but these essentially reduce to probabilities, expected values, premiums, income and investments or reserves. By evaluating these variables, an insurer determines the cash flow coming in from premiums and/or investments versus the probabilistic assessment of the expected value of cumulative claims during the specified period such as a month, quarter or year. Insurers put premiums to work in investments such as stocks, bonds, and real estate. By marking up the premium structure they intend to make a profit. If the losses are greater than expected, the insurer is impaired and can have moderate to large losses. If the insurer's actual claims are less than expected then the insurer made a greater than expected profit.

In essence, buying insurance coverage is a generalized and simplistic approach to options. Not options trading per se, but buying a put to protect against potential downside negative events. For instance, a person buys motor vehicle insurance to protect against accidental damage to the vehicle. There is most likely a liability component as well. A party may purchase homeowner's coverage to protect against liability and structural damage. Depending on the coverage and the deductibles, the premium structure varies. Low or no deductibles have the highest premiums whereas moderate or large deductibles have lower premiums. Another similarity is that there is a term or time limitation. The policy period is in part similar to the option expiration or life.

There are important differences between option-like purchases of insurance and option purchases and sales for real estate, securities, derivatives, currencies, indexes, futures and options on futures and other markets as well. One of the primary differences is suitability and buyer-beware issues. These mostly occur in the other markets. Insurance has its own regulatory framework.

The application of this insurance system is substantively different than securities or derivatives. First of all, when you buy insurance, it is generally non-assignable or non-transferable with very few exceptions, if any. If you transact in securities, futures or options particularly of a listed variety, then by definition they are available for purchase, sale, transfer, assignment, exercise, delivery, and other transactions. Insurance transactions tend to be pinned to specific policy period dates whereas the other instruments have a potentially more rapid position and timing cycles. Also, you can more freely get in-and-out and back in again in the derivatives and other instruments but not insurance. A party does not call up the insurer on a recurring basis to get out of coverage for the day, week or period and then back in again and so on and so forth. In fact, doing this actively would most likely have a negative impact of insurability and trigger a higher premium cost structure. This is not necessarily the case for securities, derivatives and other instruments.

Furthermore, securities, forwards, swaps, futures, options and other derivatives tend to be homogenized. This is not the case for individual insurance policies. While the insurance policies have similar language, the actual underwriting, renewal or cancellation of coverage is different. Even the payment process for positions varies. Every time a securities or derivatives investor, trader, speculator, or risk manager has a gain or a loss, that party does not have a claim adjuster analyze the situation. When there is an insurance claim there is a process that includes claim adjusters and others such as mechanics, engineers or other experts.

Yet another degree of complexity exists. It has been mentioned that there are microeconomic or individual risks, regional or intermediate risks, and mega or macroeconomic risks. There is the heterogeneous versus homogeneous comparison. This means that the heterogeneous elements or individuals so to speak have different tastes, needs, financials, longevity, and other demographic profiles. How this comes into the process is that each individual's behavior and actions may widely vary. They are not uniform. This is unlike a homogeneous group where there is a comparative uniformity in demographics, actions, behavior and decision-making. For example, when applied against exchange traded option products, there are rules of exercise and assignment. In a simple case, if certain options expired in the money, then there would be an automatic exercise in accordance to the rules and stipulations. Therefore, unless there were instructions to the contrary by an account holder, there would be action taken to generate the in-the-money returns. This does not necessarily happen with insurance. If there is a claim, it has to be presented and then reviewed before payment is made on a case-by-case basis.

While this could be somewhat modified with some insurance products overall it could create more problems. Suppose that a community of 100 housing units bought the properties all at once and at the same price and they all had insurance according to the present invention for market value for which they all paid the same premium. These suppositions can be modified but it is necessary to comprehend the basic process first. In fact, the more variables and variants, then the greater degree of heterogeneity. Even here for illustrative purposes and starting with relatively homogeneous conditions, the market and its participants become more heterogeneous.

Furthermore, assume that housing prices declined by 25 percent. Out of the 100 original owners, 10 sold and moved on. At the time of sale, the 10 owners had insurance according to the present invention and would collect payment provided the terms and conditions for payment were satisfied. The insurance company would not necessarily have a forced exercise for the remaining 90 original owners even though they too at that time would probably be in-the-money on their policy according to the present invention and out-of-the-money or experiencing a loss on the actual house. Continuing with this example, suppose 12 more original owners sold but this time the market was down 33 percent from the initial purchase price. Those 12 sellers would then have insurance coverage for the larger loss, provided the terms and conditions state so, and the remaining 78 owners are deeper-in-the money for their coverage policies but experiencing larger losses on the actual properties. During this time if the new owners bought insurance coverage according to the present invention, their initial market value would be set at 25 percent less than that for the original 100 owners. Similarly, the next 12 buyers would have their initial market value set at 33 percent less than the original 100 owners market values.

Continuing with the above, now assume that the housing market has not only recovered but is now 19 percent higher than the original price. It is assumed that this is correct because it is based on 4 comparable sales. Therefore, the 4 new owners could have their coverage limits set at the higher established market values. Subsequently 2 more houses sold and this time the price for both for simplicity purposes was 45 percent higher than the original price. Therefore these 2 new owners would be eligible for higher market value limits.

It should be noted that the homeowner(s) might request or opt for different or revised market value coverage and/or temporalities and stipulations. The fluctuations in market values, as well as additions, demolitions or destructions change the potential insurability and market value coverage. Suppose an original owner made a 22 improvement to the property. This implies that the property may now be worth 122. Depending on the improvement, the actual market value may be equal to 122, more than 122 or less than 122. Regardless, the policy and its coverage may change in a designated manner.

It should be noted that there may be additional costs for these changes or applications for further underwriting review. Depending on market conditions these costs may be paid by the insured, the insurer, or both.

With the passage of time, the 100 owners may be completely different than the original 100, the remaining pool of 90, then the remaining pool of 78 and so forth. Realistically, the 100 original buyers may have some coverage or no coverage, different deductibles, different motivations to stay or leave, different financials, different demographics and different triggering events in their lives and policies. Therefore, the Insurance Transaction System and Method of the present invention is necessary. The mathematics and applications become more involved as more users are brought into the system, each with their own underwriting profile. It is easy to see that other properties such as commercial, virtual, or synthetic magnify the insurance and probabilistic space.

Unlike standard exchange traded derivatives, the coverage according to the present invention is quite personalized. Also, there can be variants including but not limited to an American Style option exercise whereby the owner may exercise the policy clause to collect the determined coverage before a sale, conveyance or other transaction. However, this may or may not interact with other coverage and clauses. The policy language governs. The other coverage can be traditional homeowner's or commercial insurance and so on. One technique of many is to connect the exercise of the insurance claim, if any, to a sale, exchange, conveyance or other stipulated transaction, condition, event or trigger. This would approximate a European style option but again on a case-by-case basis.

In the event of physical damage, depending on the policy language, the owner may file for the larger of the two claims, market value or homeowner's insurance claim. A variant of this is that the owner can only collect the smaller of the two. These are simple examples. Actual variations are dependent on the policies and actions and range between extremes.

While there are some similarities of insurance to options, there are significant differences in approach, methodologies, and processes and so forth between the two.

Nevertheless, the conceptualization of this innovative insurance space is furthered by option like examples though one is primarily heterogeneous and the other homogeneous.

Suppose a person buys a building lot for $500,000. It is pointed out that transactions can occur in different currencies or be valued for exchanges, cash-free or otherwise. If the person wanted the coverage to start from the $500,000 level the premium could be quite costly, particularly on a monthly, quarterly, semiannual or annual renew basis. If the person were prepared to forgo the first $50,000 in coverage, then that policy would have a deductible of $50,000 and in the parlance of options a strike of $450,000 for a put-like feature. The premium would decline as the immediacy of the coverage changed. Suppose the purchaser thought that this land was subject to moderate risk but doubted that the property would be worthless or virtually impossible to convey, by sale or other transaction. This virtually impossible situation can occur when there are serious environmental issues. Often the owner is responsible for cleanup and/or remediation. The purchaser thinks that the property even if it did decline in market value would not decline past $300,000. Therefore, the coverage is now an approximation of 2 puts, one purchased with a strike of $450,000 and the other a sale or implicit sale of a put with a strike of $300,000. This arrangement effectively reduced the premium cost for the land purchaser.

For a somewhat different perspective, while a purchaser can buy a house or other property, it is assumed for now that it is a house for $500,000 of which $400,000 is allocated to the structure therefore indicating the land is worth $100,000. If the purchaser made a down payment of 5 percent or $25,000 and was worried about losing the down payment coverage, according to the present invention, could be purchased. Here, there would be no deductible with coverage starting at $500,000. If the primary concern was the $25,000 then a policy could be written for that coverage. In other words, the coverage would start from $500,000 and continue to the threshold of $475,000. This would cost less than the having a greater or wider coverage range.

Continuing with this example, the coverage could be calibrated to match increases in equity balance as determined by initial purchase price less mortgage(s). Or, the coverage could be calibrated against the outstanding mortgage balance(s), or against an adjusted market value. Of course the thresholds, deductibles and other parameters are subject to change.

Suppose the homeowner or property owner wanted coverage according to the present invention, but did not want to or could not afford to pay much for it. There is a myriad of solutions that are individually oriented.

Further suppose the homeowner was willing to forgo some or all of any potential upside in the market value of the property. This forgoing of appreciation could pay for the downside protection. Illustratively, the homeowner wanted protection starting at $475,000 the amount of the mortgage. The homeowner is prepared to lose the down payment but not be impaired for the balance of the mortgage. Then a policy could be approximately written as such. Insurance coverage according to the present invention starts at $475,000 and continues all the way down to zero market value of property. In exchange for this coverage the homeowner forgoes any gains above $525,000. In other words, if the property sold for $600,000, the homeowner would receive $525,000 and the insurer the remainder of approximately $75,000. The reason that approximately was inserted is that there are interest rates and interest rates differentials, as well as an implied shelter and economic benefit of owning and residing in a property. Those variables as well as the probabilities, underwriting history and other factors would modify the amounts and/or premiums.

In the circumstance the homeowner did not want or could not tolerate any market value risk, the homeowner would effectively buy the put-like coverage starting at $500,000 and then sell an effective call against the property that effectively capped a subsequent sale or transaction event at $500,000 with any increase above accruing to the benefit of the insurer. Depending on the valuation criteria, this type of coverage would transact at no or comparatively low cost to the homeowner. Actual premiums can only be generated on actual input into the system.

These option-like strategies can be singular or plural, basic or complex, vertical, diagonal, saw-toothed, horizontal or other spreading combinations, and/or various degrees of synthetic short positions against the actual long or holding. Conversely, the positions can be constructed to create various degrees of being synthetically long market directionally against actual liabilities or shorts. The products and properties can combined in multiple stacks and/or strips at the relevant terms or timing points and periods.

The time value of money and the volatility structure are 2 of many variables that influence the premium structure. Therefore one could have some sort of shared appreciation or participating mortgage combined with this product. One could even pass on those mortgage products and effectively do the same with a configured insurance of the present invention. The variations are essentially limitless as to timing, amounts, deductibles, premiums, properties, events and stipulations and so on and so forth.

Whether involved or not with an esoteric derivative or exotic mortgage, the property owner can get a clear statement of what type and variety of coverage and what the net cash premium, if any would be with the insurance product of the present invention.

However, all these policies basically focus on microeconomic or individual events. Large scale, mega or macroeconomic coverage has been elusive at best and it has focused on structural damage not market value damage. Many insurers have even withdrawn from many markets where they previously offered this physical damage coverage against hurricanes, floods and other natural disasters. By using this insurance space and system, there can be a return to these markets at least in part by insurers.

By offering various choices or alternatives to the potentially insured, an insurer can balance and re-balance its risk profiles and profit models.

Scripts and Scripting

To demonstrate the complexity of the system, its products, and parameters consider that many models typically use only one, two or three subscripts per variable or parameter. That is useful and helps to quantify the concept or situation particularly in the abstraction. Yet actual applications need to account for more. Here, the parameters or variables are created on a need-to basis. As more or new information is created and developed that information needs to be absorbed into the process especially if it is a primary or dominant factor. Furthermore, variables or parameters may be symmetrical or asymmetrical. To account for these differences the system uses not only subscripts but superscripts as well. This next step or dual technique enables the system user to identify and evaluate individual and/or low probability risks, the so-called microeconomic risks against an overlay of large scale and/or higher probability macroeconomic risks. Macroeconomic events and risks tend to affect a wide range of people or regions—a concentrated pool; microeconomic events and risks tend to affect a scattered range of individuals—a diluted pool. Moreover, there can intermediate risks and events that require intermediate scripts that expands the scope beyond duality. These intermediate scripts occur between the superscripts and the subscripts. There may be items on the cusp or undergoing a transformation. As such, these are better described and defined as being neither macroeconomic nor microeconomic in nature. For purposes of this filing and understanding, the inventor uses superscripts for macroeconomic or mega events and conditions, subscripts for individual and/or microeconomic events and conditions. The intermediate subscripts are for items that are more of a blend or in transition. In a mathematical and societal sense, individuals are the elements of composition. They constitute an economy and institutions thereof. This is multi-dimensionally reflected in this system.

Depending on context, the subscripts may be somewhat more independent, the intermediate scripts may be somewhat more interdependent, and the superscripts may be somewhat more dependent. The scripts need not be symmetrical across all variables.

An example of a scripting process is as follows. Assume the X is a property. Then X.sub.i, j, k would start to define and describe the property. Furthermore, subscript i refers to the type of property, subscript j indicates the location, and k indicates whether occupied by owner, unoccupied, rented, damaged, destroyed, and so forth. Therefore i=1 would refer to a single family dwelling, i=2 would refer to a multiple family dwelling, i=3 would refer to a condominium, i=4 to a farm and so forth. Therefore, subscript j=1 refers to an address, j=2 refers to a zip code with suffix, j=3 refers to country code, and so forth. Subscript k indicates occupancy status. For example, k=1 refers to owner occupancy, k=2 refers to unoccupied, k=3 refers to rented, k=4 refers to damaged, k=5 refers to destroyed and so forth. Therefore, X.i.sub1, .j.sub2, .k.sub1 means that a single-family house, identified by zip code and suffix is owner occupied.

When the subscripts are in default or equal to zero (0), they signify blank.

Intermediate scripts would be constructed as follows.

Again X is a property and int represents an intermediate script. Then X.int.i, j, k, l would further define and describe the property. Furthermore, intermediate script i refers to the metropolitan area price index, intermediate script j indicates the metropolitan area price index for a recorded time, and intermediate script k indicates the state or province area price index and intermediate script l indicates the state or province area price index for a recorded time. This enables the application of different time series.

Therefore, i=1 would refer to New York City metropolitan area, i=2 would refer to Yonkers, i=3 would refer to White Plains, and so forth. Moreover, intermediate script j=1 refers to the metropolitan area price index for a recorded time 1, j=2 refers to the metropolitan area price index for a recorded time 2, j=3 refers to refers to the metropolitan area price index for a recorded time 3, and so forth. Intermediate script k the state or province area price index. For example, k=1 refers New York State, k=2 refers to New Jersey, k=3 refers Connecticut, and so forth. Moreover, intermediate script l=1 refers to the metropolitan area price index for a recorded time 1, l=2 refers to the metropolitan area price index for a recorded time 2, l=3 refers to refers to the metropolitan area price index for a recorded time 3, and so forth. Therefore, $X.i.int1, .j.int2, .k.int1, l.int.2$ means New York City metropolitan area price index for time 2 and New York State price index for time 2. The relational aspects can be constructed by $X.i.int1, .j.int2, .k.int3, l.int.4$ that represents New York City metropolitan area price index for time 2 and Connecticut State price index for time 4.

When the intermediate scripts are in default or equal to zero (0), they signify blank.

Superscripts would be constructed as follows.

Again X is a property and sup represents a superscript. Then $X.sup.i, j, k, l, m, n$ would further define and describe the property. Furthermore, superscript i refers to the country, superscript j refers to the country macroeconomic index or statistic, superscript k refers to the country macroeconomic index or statistic for a recorded time, and superscript l refers to the country, and superscript m refers to the country macroeconomic index or statistic, superscript n refers to the country macroeconomic index or statistic for a recorded time. This enables the application of different time series.

Therefore, i=1 refers to the United States of America, i=2 would refer to Argentina, i=3 would refer to Brazil, and so forth. Moreover, superscript j=1 refers to the country real estate index or statistic, j=2 refers to the country household adjusted gross income, j=3 refers to refers to the country per capita adjusted gross income, and so forth. Superscript k refers to the country macroeconomic index or statistic for a recorded time. For example, k=1 refers to country macroeconomic index or statistic for a recorded time 1, k=2 refers to country macroeconomic index or statistic for a recorded time 2, k=3 refers to country macroeconomic index or statistic for a recorded time 3 and so forth.

Moreover, l=1 refers to the United States of America, l=2 would refer to Argentina, l=3 would refer to Brazil, and so forth. Moreover, superscript m=1 refers to the country real estate index or statistic, m=2 refers to the country household adjusted gross income, m=3 refers to refers to the country per capita adjusted gross income, and so forth. Superscript n refers to the country macroeconomic index or statistic for a recorded time. For example, n=1 refers to the country macroeconomic index or statistic for a recorded time 1, n=2 refers to the country macroeconomic index or statistic for a recorded time 2, n=3 refers to the country macroeconomic index or statistic for a recorded time 3 and so forth.

Therefore, $X.i.sup.1, .j.sup1, k.sup.1, l.sup.1, m.sup.1, .n.sup.2$ means the United States of America real estate index for time 1 and the United States of America real estate index for time 2. Other relational aspects can be constructed by $X.i.sup.2, .j.sup1, k.sup1, .l.sup.3, .m.sup.1, .n.sup.3$ which represents Argentina real estate index for time 1 and Brazil real estate index for time 3. When the superscripts are in default or equal to zero (0), they signify blank.

Insurance companies, agents, re-insurers, and others who are duly authorized can use the product, methods, processes and mechanisms within the confines of their systems. This occurs by an interface for the transmission of data and criteria to the origin. The origin then makes use of this information and may augment it by proprietary means. Then the information and evaluation is stored and a report sent to the related party. This is particularly helpful when dealing with legacy systems, particularly on the outside. This anticipates cases of merging insurers or parties whereby they are moving to one system or one is migrating to the other's system.

ODDS/EVENS

The concept and application of ODDS/EVENS quickly alters the temporal and probabilistic space. Conversationally, this year the insurer covers you because it is an even number year, next year the insurer covers your neighbor because it is an odd number year. This process can be more complex. It does not have to be simply integer alternating. The enormous significance of this is that the insurer can split or divided the insurance pool across time boundaries and not just customary risk classifications. This technique in its simplest odd/even formulation just reduced the insurer's exposure by one-half; and further reductions across time are now possible. Equally important, the insured has full coverage for half the time depending on whether they are odd or even when there was no coverage before. Nevertheless, if a potential or actual insured wants full-time, unbroken full coverage then they have to pay more for it. Of course, the premium would be higher. In recent years various insurers have left different markets, no insurance available, or will only renew existing policies for widespread event coverage such as flood, hurricane, or other disaster. This invention can enable a reversal of that trend.

Some variations of this are full coverage for all of the time, full coverage for some of the time, some coverage for all of the time, some coverage for some of the time, no coverage for some of the time, and no coverage at all.

Depending on the economics, some coverage is better than no coverage. This inventive timing mechanism alters the no chance, no coverage, zero probabilistic space into not only a possibility but into a probability of coverage. From the insurer's perspective in an odd/even world they are only exposed to only half of the policies at any point in time. This is profoundly important for mega disasters and/or macroeconomic events coverage. Continuing along these lines policies could be written for years ending in 0, 1, 2, 3, 4, 5, 6, 7, 8, and 9. This further disperses the insurer's risk over time yet the insured has coverage.

Moreover, as other insurers come into the system, there is a broader insurer base to cover these risks and gaps in time. In other words, there can be arrangements that another insurer underwrites the alternating gaps in coverage thereby extending the coverage space for the insured. Or, the potential insured can try to acquire different policies from different insurers.

Consider a boat. Typical insurance can deal with the passengers or cargo in a microeconomic sense because of the dispersion of low probability events. The passengers or cargo are spread about the boat. Now consider a boat where all the passengers or cargo are on one side. The first boat example is more stable than the second boat example. The second boat example is analogous to a macroeconomic risk where all or most are positioned left or right of center. It does not require much to capsize the second boat example. In fact, the further from center, the greater are the outlier risks.

Now visualize a process and system whereby there is a more orderly transition from one side to another side. The transition is a risk balancer by placing different parties on the right, left and even center.

Lastly, consider the hull of this boat full of risks as being an inverted or upside-down bell-shaped curve. The more weight, weights or parties that are on one side and further away from center or the mean or modal value, the more risky the situation. The boat can roll and sink. That is a visualization of a macroeconomic risk.

For gap or no coverage years, the potential insured may get coverage from other insurance companies. While this may be initially more costly because of the lack of bundled risks and premiums, the insurers and insured can try to blend their overall risks bases or use other risk management tools and instruments.

ON/OFF

The ON/OFF process can be singular or plural. In a simple singular case for macroeconomic coverage, the policy may be alive but dormant according to the terms. Again, the simple case is odd/even coverage. More complex cases involve different parameterization of the active and dormant periods or phases.

Next, the ON/OFF process would typically refer to the macroeconomic aspect not the microeconomic aspect. For example, government may mandate motor vehicle insurance. Collision and other coverage may be required by the lien holder to protect the value of their loan. Therefore each individual or business is required to have coverage. Likewise, mortgage lenders may demand coverage. This is the microeconomic aspect. There is a need and often a requirement for continuous coverage for these microeconomic situations. This is not quite the situation for mega or macroeconomic events. While lenders may require natural disaster coverage so long as the loan is outstanding, that requirement ceases when the loan is paid in full. The overlay of macroeconomic conditions and events is more pervasive. Mega or macroeconomic events can impact the value of collateral or even the financing, maintenance and usage of the property or right. These events continue to overlay the property or right whether paid in full or not.

Different Pools and Different Risks

There are different pools and different risks. On an individual or microeconomic perspective, different types of houses have different material composition and proximity to fire hydrants or other useable water sources to fight fires. Some neighborhoods have higher incidents of fire. Other areas are more vulnerable to flood or wind damage. Still others are prone to tornados. Some localities or communities experience more rapid turnover in housing. The stay rates are lower in some places and higher in others. A simple example is the difference between Northern California compared to Southern California. Then areas within these regions can be partitioned. Demographics play an important role. Migration to different states or communities for retirees modifies the property transfer process. For example, specific areas may have a higher proportion of elderly. Sale of property is then more likely to be triggered by a health or death event and not job relocation. Likewise, this is the case for senior or assisted living housing communities. On the other end of the life cycle are starter home communities and in between are move-up and various life-style properties.

Exercise Event or Events can Vary

The exercise event or events can vary. They may be singular or plural. These events may be the actual sale, settlement, partition, tax-free exchange of properties, taxable exchange of properties, eminent domain action, fire or other customary damage, death of one owner, death of some owners, death of all owners and property goes into estate. Now there are choices of market value recovery or comparative policy value recoveries.

Events that May Exclude

Events that may exclude the payment of claim would be owner or policyholder directed arson, water damage, neglect, serious neglect, willful neglect, deceptive or fraudulent conveyance or transaction, criminal activity, constructive abandonment, abandonment, failure to maintain in a reasonable manner, failure to restore after payment of customary damage claim, or foreclosure. Innocent spouse or innocent party language, rules, regulations, and laws may modify these items.

Skipping, Phasing and Other Temporalities

Skipping or phasing may be periodic or occasional according to temporalities, terms, active or dormant coverage terms. Somewhat different than customary policies premiums may or may not be paid even in OFF years versus ON years coverage. Or there can be a lump sum premium. Other but not limiting variants are for ODDS or EVENS, years or alternating policy years for ON and for OFF calendar years, fiscal years, policy years and so forth.

The potential insured can request or opt for high, intermediate, low or no coverage. Conversely, the potential insurer can offer high, intermediate, low or no coverage. The invention improves the insurance space.

For example, securities and derivatives in the United States may be taxed as long-term capital gains, short-term capital gains or a blend. While they provide protection, are risk management or hedging tools they have suitability, funding, accounting, taxation, and implementation criteria. Other jurisdictions may have similar, widely different or no such tax issues.

There may be separate and distinct tax basis adjustments. These depend not only on jurisdiction(s) but the products, instruments, and usages. For example, when insurance is compared to securities and derivatives, this insurance space has significantly different tax aspects and consequences, and considerations. For houses as well as other properties, capital improvements affect the tax basis and even the insurance coverage. Additions to a house or commercial property increase the value of the structural component of the total property.

Once the policyholder buys the coverage, the insurance company manages the policies, premiums and investment base to be prepared for the contingent or potential liability.

Interest rates, taxes, financial liquidity, jobs and income, availability, financing availability, inflation, deflation, and general price stability are some of the variables that have a bearing on these markets. These variables are large scale or macroeconomic.

Analogies

The more concentrated the acid, the "riskier" it is. Likewise, the more concentrated the alkaline, the "riskier" it is. As you move to extremes on the pH scale, the greater the risks. Yet combining these risks can "neutralize" a very risky profile into a more tolerable or manageable one. Thus, the combination, allocation, and arrangement of different risks can offer efficiencies that optimize the risk/reward/premium structure. Hereto, by combining different risks one can lower risk profiles and premium structures.

In a physical or chemical analogical sense, the best or less risky mode is that the invention be in solution for a more stable degree of neutrality. Moreover, different batches are to be processed over time. In other words blend, modify and neutralize the plurality of risks across time in a preferably selective parsed process. There are other modes that serve other valuable purposes.

Similarly, naturally occurring radioactive material is comparatively low risk, not extremely dangerous. However, when processed into a concentrated portion, it is extremely high risk, extremely dangerous to point of fatal. The same applies to economic and financial risks. Some of these risks when isolated can be potent. A few examples of this are evident in the mortgage-backed and asset-backed securities markets. Therefore, whereas acids, bases, and radioactive materials can be useful though dangerous, so too is the case with mega, economic and financial risks. They all require special precautions, offsets and management handling.

Ordinary property or homeowners insurance is relatively isolated to events occurring at that location and/or individual but market risk is much broader and absorbs the weights of multiple parties, locations, and events outside that location. The probability is comparatively high that many, not a few, will be damaged at once. In other words, the homeowner or property owner absorbs his neighborhood, locality, regional, national, international, and global risks.

Simply put, an insurer that offers homeowner coverage plus insurance coverage of the present invention together has a more efficient risk management structure than two separate insurers. The Insurance Transactional System and Method of the present invention enables this.

Moreover, an insurer that offers homeowner coverage, auto coverage, and insurance coverage of the present invention has a competitive advantage. Further expanding the list improves this diversifying effect.

Similarly, the commercial user that has property coverage, vehicle fleet coverage and market risk combined insurance coverage has a lower risk profile than these products separately.

Financial spreads, discounting and time value of money, probabilities, constraints, expected values, and other variables complicate the insurance business. Insurers depend on their reserves and investments as well as their investment income and premium income to payoff claims. If there are no reserves and only premium income then the process can quickly terminate. The odds or probabilities are disproportionate when evaluating macroeconomic events from a traditional perspective and methodology. Illustratively, it is a few claims in a microeconomic sense versus most or all claims at once in a macroeconomic sense. Mega and negative macroeconomic events occur. When they do occur, it is essentially everybody at once, no parsing of claims over time.

In the realm of worst-case scenarios, the situation is one where everyone sells their house or property at a loss in the same policy period and there are insufficient funds to pay the claims. This invention modifies that worst-case scenario because of the temporalities. Moreover, by probabilistic chance not everyone may want to sell at the same time. Regardless, this invention restructures the probabilistic structure and reduces the potential of all claims at once. This improves the system's solvency.

Again, here it is where it differs again from financial instruments such as futures, options and other derivatives, particularly those that are listed or traded on exchanges or computerized networks. For instance, there are rules about automatic exercises and assignments for in-the-money and deep-in-the-money options at expiration. Moreover, there are rules that permit exercises of seemingly at-, near-, or out-of-the-money options. There are other rules regarding assignments. Insurance products do not force automatic exercises whereby a party automatically collects the in-the-money amount or claim payment. Futures are ultimately settled by a potential one-last payment. Also, futures depending on the rules and contract may be settled by cash, exchange-for-physicals, receipt or delivery of a commodity or financial instrument or offset by a closing transaction that may be a purchase in the case of a previous short, or a liquidating sale in the case of a previous purchase. While some properties may change title in case of a total motor vehicle loss or the like, insurance claims tend to be paid one policyholder at a time.

The insurance of the present invention can take a European approach, an American approach, or other option approach. That is it can be structured that the payment occurs on the sale of a property, the death of the property owner(s), or exercised prior to a sale, conveyance or other designated event set. In general, the more flexible the instrument or policy, the more costly it is.

However, the expiration is not necessarily one set date. The expiration can be at the end of the stipulated term, it can be cancelled for specific causes, or it may expire upon exercise of a market value claim, other property claim, or even be reset or extended. Different events can trigger different outcomes, payments, and adjustments. For example, if a property was fire damaged, depending on the coverages, the policyholder may opt for the property damage amount or the market value damage amount. If the market value coverage amount was opted for then the customary property may still remain in effect either in part or total or even subject to cancellation after a designated date.

Temporalities and Series Expansions

This invention structures, tiers, or layers the products to diversify the potential claims over time. It alters the time-space structure for insurance for relatively high variable probability, wide area events. These are often referred to as macroeconomic, mega or disaster events.

In the process, it has switching devices such as ON/OFF, ODD/EVEN, and DECIMALS. ON/OFF is a switch that indicates whether the coverage is ON or OFF for a specified span. ODD/EVEN is another switching device that indicates whether the coverage is on for ODD years or periods or on for EVEN years or periods. An extension of this is DECIMALS whereby the coverage is on for years or periods designated as 0, 1, 2, 3, 4, 5, 6, 7, 8, 9.

The switching device for ON/OFF is (S) where S is either 0 for OFF or 1 for ON or 99 for bypass.

The switching device for ODD/EVEN is (N) where N is either 1 for ODD or 0 for EVEN or 99 for bypass.

The switching device for DECIMALS is (D) where D is 0, 1, 2, 3, 4, 5, 6, 7, 8, 9 or 99 for bypass.

These switching devices are prior to the temporalities and the related series and series expansions. These devices switch or move potential policies along different paths for premium calculations. The option and premium calculation process now has sufficient data to proceed depending on the status of the switches. In other words, if the switches indicate bypass go directly to option and premium calculations with following time or temporalities. These can be simple series or expanded series.

Typically, property damage policies are written for 1-year periods, or (0,1) where 0 is now and 1 is 1 year. A 2-year policy would be (0,2), and a 10-year policy would be (0,10). Title insurance policies are written as (0, Sale Event Date). In other words, the insured purchases a policy for one premium and the coverage continues until the property is sold or otherwise conveyed.

In a similar manner, a simple policy of insurance of the present invention could be purchased for (0,1), (0,7), or (0, sale/death/other conveyance or triggering event). The first notation indicates buy now at time 0 and policy continues for 1 year. The second notation indicates buy now at time 0 and policy continues for 7 years. The third notation indicates buy now at time 0 and policy continues until sale/death/other conveyance or triggering event. These few examples do not limit the potential variants and configurations.

The next stage is a series expansion. Here, (0,0,5) or policy of insurance of the present invention is written now, coverage starts now and continues for 5 years. A variant of many would be (0,2,5), or a policy is written now, the coverage period starts in 2 years and continues through year 5.

Another span is entered into the series expansion. Here, (0,0,5,7,10) or policy of insurance of the present invention written now, coverage starts now and continues for 5 years. Then it goes dormant until year 7 and continues through year 10.

In an analogical sense, the insurance of the present invention behaves like a currency or foreign exchange market or complex interest rate structure market. There is a specification of 1, 2, or 3 dates or points in time. These could correspond to spot or now, forward time, and/or forward forward time. Forward forward indicates a forward contract to start at a forward time. Now comparing the insurance of the present invention to these other products, differences start to happen. The currency, interest rate and even commodity markets deal with exact amounts for date specific. The insurance of the present invention stipulates what the potential coverage may be given insurable events during policy life. The insured collects nothing if there is no insurable loss during life of policy according to contract. This then is a date uncertain event contract for probabilistic payoff amounts, if any, with known ranges.

Therefore, the probability structure, space and coverage have been altered by agreement. Now while these large-scale events will still occur, the relationship among the participants within that insurance space has been modified.

This invention allows for as many defining variables as necessary to specifically define all the relevant time periods, switching devices, and other conditions. This insurance space with its system, products, methods, and mechanisms can also be used for epidemics, acts of terrorism, and wide-scale disasters.

SET/RESET

The SET/RESET periods are not necessarily coincidental. A SET establishes all the policy temporalities including basic term. A RESET allows a policyholder to return to a reset market value coverage situation and/or change the temporalities if accepted by the insurer. Not all policies would necessarily have a reset feature. The reset feature is more costly and additional premiums would be required.

The model, process, system, methodology, pricing mechanism and underwriting criteria are flexible to address a changing environment.

In one particular embodiment of the invention, a method for providing insurance coverage is given, wherein access to at least one database stored in a computer accessible memory device is provided. The database includes information about a particular property or interest. The system of the invention utilizes the information in the at least one database to create, risk profiles over time, relative to insuring the particular property or interest. More particularly, an algorithm stored in a non-transitory memory device of the system and executed by a processor of a computer in the system processes the information from the at least one database in accordance with a set of rules programmed into the algorithm, to create the time-related risk profiles.

Additionally, in one particular embodiment of the invention, for a particular policy term of a first duration, using the risk profiles created, one or more coverage periods are determined in which insurance coverage is provided on the particular property or interest by a first insurer, the total duration of the one or more coverage periods being less than the first duration. Such a determination can additionally be made by a computer of the system storing and executing an algorithm for making such a determination, if desired. Subsequently, an insurance policy is generated for the particular property or interest having the particular policy term and which provides coverage by the first insurer only during the one or more coverage periods determined.

In another particular embodiment of the invention, insurance coverage is provided by at least a second insurer on the particular property or interest for at least a portion of the period of time during the policy term not covered by the first insurer. Additionally, if desired, the first insurer and the at least a second insurer are selected from a pool of potential insurers in the at least one database. In a further embodiment of the invention, the system uses the risk profiles created to determine one or more coverage periods in which insurance coverage is provided on the particular property or interest by the second insurer, the one or more coverage periods of the second insurer being different than the one or more coverage periods of the first insurer. In such a case, if only two insurers provide coverage, then an insurance policy for the particular property or interest is generated in which insurance coverage provided by the first insurer and the second insurer, together, provide insurance coverage for the particular property or interest over the entire particular policy term of the first duration.

Additionally, as discussed herein, if desired, the coverage can be switched on or off by certain "switching devices". A switching device, as used herein, is an occurrence or event that triggers a period of coverage or non-coverage. In one particular embodiment of the invention, the switching device is related to time, such that the occurrence or event triggering the switching mechanism is the arrival at a certain time, date and/or time period, in the policy period. For example, in one particular embodiment of the invention, a start of a first coverage period of one or more coverage periods is deferred for a period of time after the start of the policy period. In another particular embodiment, the timing of the one or more coverage periods during the policy term is determined by a switching device.

Other types of occurrences can be used as "switching devices", in accordance with the present invention. For example, in one particular embodiment of the invention, a switching device is chosen from the group consisting of: 1) on or off; 2) odd or even; and 3) decimals or fractions. In another particular embodiment of the invention, switching device is one or more of scripting, skipping, phasing, temporalities, series expansion, odd-even, on-off.

Additionally, the type of coverage generated can be a non-typical type of insurance coverage on the property or interest. For example, in one particular embodiment of the invention, the coverage provided during the one or more coverage periods insures, among other things, a market value of the particular property or interest, independent of any physical change to the particular property or interest.

The use of switching devices, as discussed herein help to reduce the liability to any one insurer by limiting the exposure of the one insurer to only the one or more coverage periods, as determined using the risk profiles. The risk profiles of one particular embodiment of the invention are generated using data stored in the database relating to the liability exposure of the one insurer in the event of a macroeconomic event. In the most preferred embodiment of the invention, the risk profiles are generated by a computer that electronically accesses the data stored in the database and which computes the risk profiles using an algorithm stored in memory and executed on a processor of a computer of the system of the invention.

The assignment of the one or more coverage periods to the one insurer, based on the risk profiles, can be performed by a computer algorithm stored in non-transitory computer memory and executed on a computer of the system, if desired. In one particular embodiment of the invention, the one or more coverage periods of the one insurer are a plurality of coverage periods separated from one another by a period of non-coverage during the policy term. As will be described herein, the occurrence of each of the plurality of coverage periods, and correspondingly, each period of non-coverage during the policy term is defined by a "switching device", i.e., an occurrence or event that triggers a period of coverage or non-coverage. Particular examples of switching devices that will be described herein include, but are not limited to, at least one of on/off, odd/even and decimals/fractions.

In another embodiment of the invention, a system for providing insurance coverage, includes at least one database stored in a computer accessible, non-transitory memory device, which contains information about a particular property or interest. The system additionally includes at least one computer in communication with the database, which under the control of an algorithm executed by the processor of the computer, utilizes data from the database to generate risk profiles over time, relative to insuring the particular property or interest. In one particular embodiment of the invention, the computer is configured to determine, under the control of the algorithm executing thereon, for a policy term of a first duration, one or more coverage periods determined using the risk profiles, in which insurance coverage is provided by a first insurer on the particular property or interest. In one preferred embodiment, the total duration of the one or more coverage periods is less than the first duration. The computer is, in one preferred embodiment, additionally configured to generate an insurance policy for the particular property or interest having the determined policy term and which provides coverage by the first insurer only during the one or more coverage periods determined. If desired, the computer can be configured to provide insurance coverage by at least a second insurer on the particular property or interest for at least a portion of the period of time during which the policy term not covered by the first insurer. In one particular embodiment, at least one computer of the system is configured to select the first insurer and the at least a second insurer are selected from a pool of potential insurers in the at least one database. In another particular embodiment, at least one computer of the system is configured to use the risk profiles created to determine one or more coverage periods in which insurance coverage is provided on the particular property or interest by the second insurer, with the one or more coverage periods of the second insurer being different than the one or more coverage periods of the first insurer. If only two insurers are going to provide coverage for the policy, at least one computer of the system is configured to generate an insurance policy for the particular property or interest in which insurance coverage provided by the first insurer and the second insurer, together, provide insurance coverage for the particular property or interest over the entire particular policy term of the first duration.

Additionally, the system can be configured to provide an insurance policy wherein a start of a first coverage period of the one or more coverage periods is calculated to be deferred for a period of time after the start of the policy period. In such a case, if desired, the timing of the one or more coverage periods during the policy term is determined by a switching device. As discussed elsewhere herein, a switching device is not a physical device, but rather, is an occurrence or event that triggers a period of coverage or non-coverage. In one particular embodiment of the invention, the switching device is one or more of scripting, temporalities, series expansion, odd-even, on-off.

In such a system according to the invention, insurance policy may be generated that provides coverage during one or more coverage periods that insures a market value of the particular property or interest, independent of any physical change to the particular property or interest. In one particular embodiment of the invention, one or more coverage periods provided are determined using the risk profiles so as to reduce the liability to the first insurer by limiting the exposure of the insurer to only the one or more coverage periods. As with the method described above, in one particular embodiment of the invention, the risk profiles are generated using data stored in the database relating to the liability exposure of the first insurer in the event of a macroeconomic event. If desired, the one or more coverage periods of the first insurer are a plurality of coverage periods separated from one another by a period of non-coverage during the policy term. Further, in one preferred embodiment, the occurrence of each of the plurality of coverage periods, and correspondingly, each period of non-coverage during the policy term is defined by a switching device. Such a switching device can be selected from the group including, but not limited to, on/off, odd/even and decimals/fractions.

In another embodiment of the invention, a method for providing insurance coverage for a particular property or interest over a predefined policy period, includes providing access to at least one database stored in a computer accessible memory device including information about the particular property or interest and utilizing information in the database to create, with a computer, risk profiles over time, relative to insuring the particular property or interest. Subsequently, the risk profiles can be used to create an insurance policy having a risk coverage for the particular property or interest distributed between two or more insurers. In one particular embodiment of the invention, the risk profiles created distribute risk coverage between the two or more insurers, such that each insurer provides only a fraction of the entire risk coverage on the particular property or interest during the policy period. For example, in one embodiment of the invention, the risk profiles created distribute risk coverage between the two or more insurers, such that each insurer provides risk coverage on the particular property or interest for only a portion of the predefined policy period less than the whole predetermined policy period. In such a case, if desired, the two or more insurers, together, provide full risk coverage on the particular property or interest for the entire predefined policy period.

In a further embodiment of the invention, a method for providing insurance coverage for a plurality of properties or interests in a group that shares a common characteristic, includes providing access to at least one database stored in a computer accessible memory device including information about a particular property or interest of the plurality of properties and of the common characteristic and utilizing information in the at least one database to create, with a computer, risk profiles over time, relative to insuring the particular property or interest. The risk profiles so created can then be used to create an insurance policy having a risk coverage for the particular property or interest distributed between two or more insurers based on a risk profile determined with regard to the common characteristic. Thus, in one particular embodiment of the invention, the coverage for the plurality of properties or interests is distributed between the two or more insurers, such that, at any one moment in time, no single insurer is providing full risk coverage for all of the plurality of properties or interests that share the common characteristic. The common characteristic shared by the plurality of properties or interests, in one particular example, relates to a common geographic area.

BRIEF DESCRIPTION OF THE ILLUSTRATIVE FIGURES AND TABLE

FIG. 1. Shows show hedging progresses from a no-hedge situation to a proactive hedge situation. The steps in the progression indicate higher degrees of activity.

FIG. 2. This analogy shows a customary pH scale from acid to base/alkaline where the middle area is neutral. Then the analogy illustrates the 2 extremes which when blended or interact they neutralize potentially dangerous situation.

FIG. 3. This analogy shows the principal only and interest only components of a mortgage-backed security. When the components converge inward, there would be greater stability. When the components are separated or stripped out, the pieces can become quite volatile.

FIG. 4. Shows a simple 2 factor subscripting for variables.

FIG. 5. Shows a more complex scripting arrangement. Here, the variables have 2 subscript factors and 2 superscript factors.

FIG. 6.1. Shows a static or snapshot view of macroeconomic and microeconomic variables. While the figure depicts evenly divided compartments or cells, this does not necessarily have to be the case.

FIG. 6.2. Shows a dynamic view of macroeconomic and microeconomic variables moving in time. Again, the compartments, cells, or spaces do not have to be even or symmetrical.

FIG. 7.1. Shows a static or snapshot view where parameters and risks are not always square.

FIG. 7.2. Shows a dynamic view of parameters and risks that are not always square moving across time.

FIG. 8.1. Shows variables or risks that seem flat that may or may not be the actual condition. It is variable perspective #1.

FIG. 8.2. Shows that what appeared to be a flat condition is actually a deeper condition. It has depth. This depth may be a layer, level or tier.

FIG. 9. Is the illustrative system and method of the present invention with interaction with computers, workstations, networks and databases. It also shows the flow of the sequenced steps in TABLE 1 that are now blocked into stages for different mechanisms, procedures, and processes.

FIG. 10. Depicts the Insurance Transaction System interacting with various computers, workstations, other devices, networks and databases. The cylinders are the databases, the blocks are the computers and devices, and the core is the system including services and products. Depending on the complexity of the insurer's network, the number of devices, databases and so forth would expand rapidly. The actual arrangement is more elaborate as it takes into account different properties and different spaces from a multitude of sources.

TABLE 1. Lists different aspects for the primary identifier or party, has a category that then takes into account all the identifiers or parties, has a category for the submitted data and/or information, compares this to any data/information that entered the fields through the initialization process or subsequent absorption of later acquired or developed data/information and then lists differences or discrepancies they may require immediate or subsequent updates, verifications, and other procedures.

The system functions within the known insurance environment by taking advantage of existing structures, procedures, processes, databases, systems, networks, personnel, policyholders and prospect lists, manuals, forms, policy language and all the other steps and features of an insurance business.

The system, processes, mechanisms, stages, procedures and steps that are herein disclosed are the best mode for applying this invention. What is disclosed here can be immediately installed, initialized, implemented, developed, used, and applied by practitioners.

DETAILED DESCRIPTION OF THE INVENTION

This invention provides a new class of insurance coverage particularly starting with real estate whether of the physical nature and virtual or cyberspace real estate. This invention with its products and system and related components is versatile. It can apply to difficult and unique properties as well as more common properties. The invention because of its capacity to determine insurability, offer insurability and manage the insurance space and products such as the policies, instruments, securitized interests, consulting and other services related thereto can be standalone or merged with other products and systems. The invention discloses how to insure not only microeconomic issues but intermediate, macroeconomic and global economic and mega events. Moreover, there are other related aspects, components, and topics that are within the realm of due diligence for all parties. Included but not limited to these related items are: accounting, analysis, internal and external consulting, expert, financial, insurance, legal, laws, rules and regulations for the jurisdictions involved, technologies, and taxation issues. The invention operates within this complicated space. Nevertheless it discloses methods, processes and a system for providing financial coverage where there was a void. On a fundamental level, it describes how to market value protect real estate interests, such as a house, and then extends into other properties and rights.

EXAMPLES

The following examples in no way limit the scope of invention to these few examples. The invention and its applications to different properties for different parties are versatile. These examples are aids to understand the invention. Sometimes the terms policyholder and owner are used interchangeably. Strict contract language in a policy would dictate.

The seeming simplicity of these examples quickly becomes complex for not only actual policies but for multiple policies and by different insurers to different insured parties.

While the plurality of examples describe house, homeowner or residential situations, analogous applications would apply to commercial, recreational, governmental, educational, and non-profit uses.

The examples tend to use simple, round numbers. This is only an illustrative technique. Actual situations are vastly more complex, not only singularly but in the plurality as well.

Many examples use round numbers such as 10 or 100. This serves multiple purposes. One can imagine 10 parties or 100 parties and quickly do the math. Also, this choice of numbers shows that the system can use raw numbers, adjusted numbers, indexed numbers, percentages and so forth.

The examples start with a moment in time and then branch out to different outcomes over time. Actual usage is more complex because every day of the calendar concerns events, transactions, start dates, close dates, claim dates and so forth.

The temporalities are extremely complex. In the past, the customary insurance policy or product had a simple policy period that started on one date and ended on another. This simplicity extended to the policy pool or policy base and essentially, that was the end of it. Now, the temporal breakthrough starts with ODDS/EVENS and proceeds to decimalization. Instead of viewing policies all being active at the same time, throughout the insurer and insured year, there is a limitless variation to spread major, mega and macroeconomic risks across predetermined time spans and even the insurers too. This innovation allows for market value risk to be insured on a massive scale but within distinctive time spans. By altering the temporal-probabilistic space, important coverage at more reasonable premiums is now doable. Without this time alteration of the probabilistic space, macroeconomic events were basically too costly to insure.

The option-like premium space is also extremely complex. It starts with a few known concepts, such as puts and calls, but uses them in a completely innovative way. Also, there are significant differences in these products and policies versus listed futures, indexes or securities options. This insurance space is basically filled with unique points, whereas the listed securities, indexes and futures are confined to relatively a few points.

The products, mechanisms, methods, processes and system can be brought on-line on a need-to basis. As more information and usage is created and developed the related databases will grow. The system takes into account feedback and structural improvement. Among the items of structural improvement is the parsing of information, data, parameters, events, temporalities and the probabilities and weights for intermediate and macroeconomic events.

Example 1A

House Burns Down Example

In the past, the policyholder would be paid the insured value of the structure and contents. If the property was valued at 100 with 80 for structure then a total loss for structure would be 80. If the contents were insured for 25 then the total claim would be for 105 or (80+25) for real and personal loss.

If the property also had environmental coverage for land and it was covered for 10 out of 20 and a contamination or fouling occurred, the amount of which was 7 then the total claim would be 87 (80+7) for real property (land+structure) and including the 25 for personal, or 112 total claim real and personal.

In the absence of any coverage the situation would be zero (0) payment for personal property, and zero (0) payment for real property. Now the real property is only worth 13 (100-80-7) for a market value (MV) decline of 87.

Therefore if there was no casualty insurance but only MV insurance coverage of the present invention, the claim would be 87 subject to all terms, conditions, stipulations and so on.

In this example, it was assumed that the policyholder qualified for the 87 payment.

There may be other structures in the area that did not burn but may be impacted by the neighbor's damage. In general, proximity to damage is assigned more weight.

Example 1B

House Burns Down (but No Personal Property for Simplification, Otherwise Same Data as Prior)

Now both coverages, traditional casualty and insurance of the present invention, are in effect. If a payment was made for casualty loss then that took care of MV loss as well. No double dipping, generally allowed. However, depending on policy (-ies), the restoration of structure and land remediation may not necessarily trigger the MV loss claim. To continue, if the policyholder/owner subsequently sells the property for 13 without restoration, the policyholder was fully covered. The policyholder/owner was made whole since the property was covered for 100, there were damages of 87, the claim of 87 was paid, and the owner/policyholder recovered the 13 remainder.

If the owner sold the property without restoration for 15, then there would be no further MV loss and no further payment.

If the owner sells the remainder for 5, then there may be an additional claim payment of 8 for further MV loss. However, it comes down to the binding contract or policy language.

If there was no environmental coverage then depending on the language of the policy of the present invention, the 7 environmental claim may or may not be covered. In some areas, watershed or aquifer incidents may be subject to other jurisdictional laws and processes.

Unless otherwise permitted by law and the insurer's themselves,

Maximum Total Coverage=Property+Land

Or,

Maximum Total Coverage cannot exceed the total property MV (land, structure, subject to environmental issues)

Depending on environmental coverage or lack thereof and prevailing laws there can be different outcomes. Again, a total burn down occurs and the loss is 80 out of 100 of which 80 is against previous structure value of 80. Furthermore the environmental cleanup is 30 or 10 more than the land value. Depending on laws and coverage the owner can be liable for the 30 in the absence of coverage or the insurer may be liable for 30 in the absence of environmental coverage. However, it is possible that using data from above and the indicated environmental coverage of 10, the owner receives that benefit and the insurer pays the difference; or the insured receives 10 from the insurer and is liable for the outstanding 20, or the insured receives 10 from the insurer and the insurer is liable for the outstanding 20.

Keep in mind this is still the neighbor's or other individual party owner/policyholder's property.

Example 1C

Partial Burn Down of Property

Another perspective is a partial burn-down. Same data as above but structure damaged to the extent of 55. Thus the casualty loss is 55 and the property is now valued at 45. If owner forgoes repairs and sells for 46, then there is no further payment to owner. Depending on contractual language, the insurer may pose question: Repair or sell? If owner says sell, and property sells for 46 in this stipulated case, then owner receives only a 54 difference not 55.

If owner forgoes repairs and sells the damaged property for 44, then a further claim payment of 1 would be forthcoming, again depending on policy, insurance of the present invention and other language.

Another variation is policy and product driven. If policyholder suffered property (structure and fouled land) but restored to "like new" condition and insured value, then the insurance product of the present invention may or may not claim for MV loss subsequent. Again, it depends on the policy. Assuming, the policy allows for a subsequent claim and the owner sells for 90 due to poor market conditions, then the insurance claim for MV loss according to the present invention would be 10. However, if there were a 12 deductible from the 100 for insurance coverage according to the present invention, then there would be no claim payment since the threshold was 88. However, if the sale were at 70 with the 88 threshold, then the owner would receive insurance payment of 18 according to the system and method of the present invention.

Continuing with this example, the upper boundary is 88 and we will state a lower boundary of 20. Then the claim amounts (CA) are parenthesized for associated sale event amounts or SEA: SEA(CA), or numerically, 75(13), 50(38), 21(67), 19(68), 10(68).

Or, insurance coverage according to the system and method of the present invention, HC=0 if SP is greater than or equal to UB =UB−SP when LB<SP<UB =UB−LB when SP<=LB Where:
HC is the insurance coverage according to the present invention
SP is the selling price
UB is the upper boundary
LB is the lower boundary
MV is the market value Generally, the values range between 0 and MV or market value, 0→100 percent of insured market value. It should be noted that a policyholder/owner might be able to ratchet-up the market value coverage over time if said property qualifies under reviewed underwriting and other due diligence processes.

Boundaries can be monetary amounts such as U.S. dollars, Canadian dollars, euro currency units, other currencies, percentages, ratios, indexes or other parameters.

It then comes down to language and usage. Returning to earlier data in this example, owner is damaged and collects claim payment, continues to own the property and market actually improves so that the land is worth 120 and then the owner sells for 145 (120 for the land and 25 for the structure.). No further payment or adjustment is made.

Keep in mind this is still the neighbor's or other individual party owner/policyholder's property.

Example 1D

Partial Burn Down of Neighbor, MV Impact on Other Property

The following assumes data of above and similarity to nearby properties. This is for illustration convenience purposes because there are differences starting with location.

Suppose the neighbor's property partially burned down. The neighbor's property was initially valued at 100 with land calculated as being equal to 20. The structure valued at 80 is damaged to the extent of 55, thereby reducing the structure value to 25. Thus the property now is valued at 45. If the physically damaged property owner forgoes repairs the surrounding or neighborhood properties are also influenced. If this influence is negative, then the surrounding property owners experienced MV declines. These declines can be visualized as rippling throughout the neighborhood, community, and wider area. This rippling effect can be subject to quantification and/or appraisal.

However, these surrounding properties did not receive any claim payment. Their damage is nonvisible yet real and financial. With the insurance according to the present invention, one could submit a claim and be compensated for the damage. Again it comes down to the individual policy and coverage.

Assume that the two parties had identically valued properties at 100 and identical coverage. This assumption is an illustrative simplification. Actual coverage and values may vary.

Assuming both parties had insurance according to the present invention and traditional coverage. The owner of the physically damaged property was made whole. Subsequently the neighbor with no physical property damage sold his/her place for 89. This represents a financial loss of 11 in MV. There may be other variables such as depreciation nevertheless this neighborhood effect is important.

If the neighbor(s) had an upper boundary of 88, then the second neighbor could not collect. If the upper boundary was 90, then the second neighbor could collect 1. If the upper boundary was 100, then the second neighbor could collect 11 due to MV loss.

Example 1E

50 Unit Development and Impact of "Comps" or Comparable Sales

Suppose there is a fifty-unit development and all units initially sold for 100 for a total value of 5,000. Subsequently, a unit was sold at 80 due to financing difficulties or other events. It would then influence the remaining units on a comparable sale basis. A quick estimate suggests a new total value of 4,000 or a cumulative MV loss of 1,000 of which 980 is spread across the other 49 properties. Now with the insurance product of the present invention, some, many, most or all can acquire MV insurance. While this may not necessarily cover the previous higher market price, it could immunize against further negative influences starting with the new market level.

The builder or developer can use the insurance of the present invention as an inducement for new buyers similar to new home warranties and other incentives. The builder, developer or existing owner can purchase the insurance of the present invention as part of the conveyance contract and present it to the new owner.

However, if a builder, developer, owner, financial institution or other did have a sale whether forced or not, that sale or group of sales represents new pricing inputs, data and indications of then current market value. These sales could be due to divestment, duress, foreclosure, subprime or other events.

If buyers intend to stay they are concerned with subsequent real estate values.

Some builders, developers or even property owners in various market cycles occasionally try to induce buyers by physical upgrades, trips and other incentives. Some rationales behind these inducements are the maintenance of comparable sales or tax considerations. The potential or new buyer may be more concerned about downside protection on the property value or MV insurance. This concern may be heightened by a mortgage that may be greater than the overall property value subsequently.

Ten, five, two or even one low comparable or "comp" transaction can seriously impact a neighborhood. The low comp could have been triggered by divorce, illness, death—estate sale, relocation, job loss, foreclosure or other event(s). Yet it is viewed and generally recorded on an unconditional basis. It does not matter whether there was a subprime, prime or no mortgage on the property. The sales or transaction price is established.

Example 2

Apartment Building Consisting of 9 Units

Here, coverage can be stratified across floors and/or units. In this simple example, it is assumed that the lower floors only contain one unit or apartment each valued at 100 and the top floor or penthouse is valued at 200 for a total value of 1,000. The apartment owner could separately market value the units with different deductibles, and boundaries. This can be useful for intent to convert the building into condominiums or other interests. Once again, comparable values influence each unit within the structure.

Assuming that units 1 through 5 are valued at 100 for a total MV of 500 and the remaining 4 units equal a total MV of 500, or a grand total of 1,000. Units 1-5 have an upper threshold or boundary of 80 and units 6-8 have an upper threshold or boundary of 100 and the penthouse or unit 9 has an upper threshold or boundary of 200. Further assume that due to various conditions, the property sells for 750. This is a loss of MV of 250. Here, the insurance of the present invention claim would be 5 for each unit starting at 1 and continuing to 5. Cumulatively, the claim for these lower floors would 25. This is determined by applying the previously presented formulation that is brought here for convenience.

Units 6 to 9 would then have a claim total of 125 since the upper boundary at time of coverage and subsequent transaction was equal to 100 percent of each of these upper floors. This was alternatively expressed for initial MV in monetary or value units of 100 for floors 6, 7 and 8 and 200 for the penthouse. Since the insurance of the present invention coverage started at the upper boundary that was equal to MV for those upper units, the loss on a prorated basis was 25 percent for each of these upper levels. In other words, total upper MV of 500 times 0.25 equals 125. The remaining value of those upper levels is now 375.

The total claim is 150, which is compartmentalized as 25 for the lower floors, and 125 for the upper floors.

Applying just one more variant out numerous mathematical constructs, if unit number 5 was insured with an upper boundary of 92 then the total claim would be 167. This is the result since unit number 5 now had an upper boundary of 92 that is 17 more than earlier assumption.

The insurance of the present invention can have variations among floors, units, lobbies, buildings and so forth. These variations need not be contiguous, symmetrical or progressively ascending, descending or even constant. It can be applied on a situational basis.

Or, insurance of the present invention coverage, HC=0 if SP is greater than or equal to UB =UB−SP when LB<SP<UB =UB−LB when SP<=LB Where:
HC is the insurance of the present invention coverage
SP is the selling price
UB is the upper boundary that accounts for Land (LV) and Structure (SV) values
LB is the lower boundary, that can be zero (0)
MV is the market value Moreover the insurance of the present invention may be constrained as follows:

insurance of the present invention Maximum Claim (HMC)=Max (UB−SP) where UB is set to MV, or lesser value at time of written policy, and SP<UB.

Or, where UB is adjusted by a stipulated appreciation or depreciation schedule,

Or, where UB is adjusted by the policy year declared insured value.

Furthermore, the land market value would be added, but could be excluded either in part or totally. In the past, traditional homeowner's insurance focused on the structure not the land. If a property was purchase for 100 and the structure was determined to be worth 78, then the policy insured for 78. The insurance of the present invention can insure the property for 100 out of 100 or any part thereof. Moreover, it can insure for more than the initial 100. This can occur if the homeowner's policy modifies the coverage amount due to inflation and/or additions. Suppose the insured structure was now valued at 85 and land is still valued at 20. Then the total property is now worth 105. If the structure increased in value to 85 from 80 and the land increased in value to 40 from 20, then the total MV is 125. If the structure declined to 79 from 80 and the land increase from 20 to 22, then the MV is 101. The mechanism accounts for other variations than those posed in these examples.

When temporalities are introduced the situation becomes:

As above in active insurance of the present invention time periods or years, such as odd/even and zero for dormant time periods or years, such as odd/even. This can further be modified by some coverage in what would have been a dormant period or year.

There is a simultaneous calculation of insurance of the present invention claim and homeowners claim when an insurable event occurs. Variations include single insurer, two insurers, and more than two insurers. The following example focuses on one insurer and one policyholder or owner.

When an insurable event or trigger occurs, it is necessary to determine the claim amount. Assuming both homeowners and insurance of the present invention coverage, it becomes an evaluation between the HC versus the HIC or Homeowner's Insurance Claim. The claim amounts can vary across time and time designated periods given the flexibility of the insurance of the present invention insurance space.

For example, the Maximum Claim could be MAX(HC, HIC) or the maximum of the two computed claims.

The Maximum Claim could also be the minimum or lesser amount of the two maximum potential claim amounts MIN (MAX(HC, HIC)). It again comes down to policy language. It is pointed out that the first example would be more costly premium-wise than the second example, when all other things are equal.

Example 3

Commercial Properties

There is an office building consisting of lobby spaces and 4 upper floors and a parking capacity of 100 spaces.

The office space can be divided into corner offices, inside windowless offices, cubicles, or vertically and/or horizontally and/or diagonally joined or even an assemblage consisting of only outside corners, or contiguous pieces according to needs and usages. Each space has its own economic, financial and zoning determinants. Likewise, the parking spaces can be below ground, above ground, on the roof, at ground level or some combination thereof.

Moreover, the stairs, elevators, escalators, other lifting devices and movement mechanisms may be partitioned, sold or leased to others for maintenance or other operating purposes. This aspects, properties or rights can have insurance of the present invention coverage as well.

The total property and rights can be partitioned into interests. Each interest or combination of interests can have separate insurance of the present invention coverage or there can be a blanket or umbrella coverage that may or may not be subject to fungible partitioning. It depends on the policy.

Moreover, if the coverage can be partitioned to go with a partitioning and sale, transaction, conveyance or other delineating process, that portion of insurance may be transferable. Again, it is the language of the policy.

Example 4

Special Purpose License

Among the special purpose licenses are a license, lease or actual ownership to use different airwaves, air currents or water and tidal currents. Airwaves may apply to various communication devices or entertainment channels.

Air currents would apply to the leasing of property sites for the generation of electricity. These sites could be on relatively windy plains or ridges where the thermals are conducive for power generation turbines and plants. Some sites are valuable because they are used for geothermal power generation.

Similarly, different water locations are functional or optimal for water-generated power either due to flow or tidal actions. Again, these properties and rights could be insurance of the present invention protected.

Example 5

Satellite, Probe, Other Craft, Stations and Substations, Orbit(s) and Position(s)

In space as on earth often the more desirable locations are taken or occupied first. The emphasis is on location and utility. Different satellites have been placed into orbit for communication, military, scientific, weather, education, imaging and GPS purposes. Governments as well as private vendors can negotiate and effectuate the launch. Over time, satellites and related craft can occupy relatively stationary positions or move along specific orbits. There are some craft that can change position as well as orbit. From a commercial perspective, the positions, types, and orbits of these satellites, varies in terms of market coverage, technological capabilities and other variables. Failure to use or replace within different time frames may subject the owner or leasee to diminished rights or even forfeiture. While the craft may have property or even other business insurance to protect against system failure, launch failure, downtime loss, or even property damage, it is the market value of spatial location and path that can be covered by a product of insurance of the present invention.

Suppose that an entity launched a $35,000,000 satellite. The satellite then traveled within an orbit that was efficient and valuable for monitoring and imaging shipping lanes. At the time of launch there was no cost for the orbit. As time passed, the location of the satellite and its orbit increased in value because others could license data about weather, commercial development and other property use within the boundaries. Therefore the position and/or orbit now had a market value. Assuming this new spatial value is worth $50,000,000, the original owner could just sell or lease the satellite, just sell or lease the position and/or orbit, or sell or lease both the satellite and the orbit. While initially the satellite may have been covered for property damage and the like, now the space itself is valuable. One variation of many of this would consider depreciation or obsolescence. In this example, the space became more valuable than the physical object within it. It is this space as well as the market value of the object, the satellite, can be now covered.

In fact, this invention takes into account these technologies for understanding and application. These technologies are used for measurement, mapping, imaging and overseeing locations and spaces as well as other uses.

Example 6

Toll Bridge or Tunnel

There may be competitive pressures or alternatives that impact the market value of toll bridges or tunnels. Also, these structures, entrances, exits and routes not only have a physical reality or substance but also a potentially conveyable right-of-way or access right. These different properties in totality or partitioned rights may be eligible for market value insurance with insurance of the present invention.

Example 7

Transportation Route or Right-of-Way

Applications and uses include but are not limited to the transportation routes or right-of-ways for airline, bus, barge, ferry, and shipping routes. In exchange for providing services, a jurisdictional body may grant certain rights and privileges to a limited number of service providers. Depending or the economics and trends, these routes or rights may fluctuate in market value. These properties or rights are eligible for coverage by insurance of the present invention.

Example 8

Virtual Space or Cyberspace

Definitions and uses are many for virtual space or cyberspace. Within, on, or even excluded from the virtual space or cyberspace are size, mass of content, utility, ease of usage, expense of usage, traffic and other elements that contribute to its value. Just because a party may have copyrighted or even registered copyrighted material does not necessarily mean primacy. There can be a variety of infringing actions that re-direct users and traffic. Also, the mere presence of content or trademarks on a relatively undeveloped cyberspace or website does not assure high listing or ranking results even if the works are of high quality. It requires special skills and more. This more refers to but is not limited to not only being at the right place at the right time, but more extensively being in the right space at the right times. Interestingly, sometimes, a short domain name without content goes a long way in Internet outcomes. These locations, spaces and properties are eligible for coverage, particularly for coverage that is not available elsewhere.

Example 9

Art, Antiques and Collectibles

Often art, antiques and collectibles are rare or unique items that require special valuations. There are securities that provide different valuation and partitioning of economic and physical usage interests. There are policies to protect against theft or physical damage. This invention is concerned with providing coverage for market value risks for the physical object and the digital or technological image of the physical object as well as the insurable space that they occupy.

Example 10

DNA and Other Matter

This area includes but is not limited to DNA in current or prior life forms. It is the uniqueness and related market value that is eligible for coverage with insurance of the present invention. There are or may be patents on different forms of DNA, enzymes, chemicals and processes but this is different. Here, different groupings or subsets of a set can now be alternately covered. This has greater application in the area of reinsurance using the invention methods, mechanisms, processes and system.

ON/OFF Switching

ON/OFF Switching coverage are predetermined rules and clauses that turn ON or OFF the insurance coverage during the specified periods. The coverage does not pay for events that occur in the OFF phase, only for events that occur in the ON phase.

When a property is sold, partitioned, or otherwise conveyed during the OFF period the MV coverage would not be applicable. For example, the owner/policyholder may select ODD or EVEN period coverage. This period could be calendar, fiscal, corporate or other entity yearly operating cycle year. ODD would refer to years ending in an odd number such as 2007 whereas EVEN would refer to years ending in and even number such as 2008.

The benefits of this arrangement especially for large-scale events whether natural or otherwise are that the insurer only is obligated to payoff on half the properties (assuming half are insured for ODD year events and the other half are insured for EVEN year events. Likewise, the insured parties have coverage half of the time but this may be preferable to no insurance at any time. This can be an expedient way of providing MV coverage in high risk (flood, fire, hurricane, tornado, earthquake, volcano areas or for contagious high risk events.

SET/RESET

SET/RESET is a switching device that determines whether a policy can collect on a casualty loss, then reset and still have market value loss coverage as well as reset casualty coverage. It can also turnoff after any claim is made, or any variation thereof.

Recalibration

Recalibration takes into account depreciation or appreciation. For example, a housing structure may be assigned no depreciation/no appreciation, depreciation at a specified rate per year that may or may not be linear, and appreciation at a specified rate per year, which may or may not be linear. The depreciation does not have to be complete. For example, a property is valued at 100 with 80 assigned to the structure. Then the property may be assigned a depreciation rate of 0.01, 0.025, 0.05 or any other rate. Then the depreciation period may be 5 years, 7 years, 10 years or any other time frame. Then in the absence of other variables, the structure would depreciate 1 percent a year, 2.5 percent per year or 5 percent per year up to a specified level.

Other benefits for a single insurer is the information gathered and analyzed for the first homeowners policy. Suppose that the property was appraised and insured as 100 with 70 assigned to structure. Then if only the structure lost value, the underlying property, the land, would still be worth 30. Therefore a reasonable maximum loss would be 70 not 100 unless there was an environmental issue. However, the 100 out of 100 would remain a possibility but the probabilities tend to dampen. Alternatively, one could insure the 70 for market value coverage and the 30 for separate environmental coverage. This would tend to lower the overall premium cost.

The layout has six column headings: Aspects, One, All, Submitted, Compared, and Diffs. Aspects are row items such as name(s) of property owner(s). The One heading refers to the primary element such as the primary property owner. All refers to other, if any, property owners. Submitted refers what is being or was just submitted. Compared is the field from the legacy systems or other database inputs. Diffs are the differences or flags on comparison between Submitted and Compared and may require further database or other actions.

Insurance Transaction System and Steps

A computer monitor view of the Insurance Transaction System and method according to the present invention is depicted in Table 1. Depending on context or usage collect may also mean enter. Scripting means the entry and placement of subscripts, intermediate scripts or superscripts to the relevant items such as probabilities, types of risks, and mapping of variables.

STEP 1. Start installation of Insurance Transaction System. Have skilled technicians and hardware available to setup interface between existing systems and insurance system and method of the present invention.

STEP 2. Start the initialization process. This means the interaction and absorption of existing data, information and parameters such as current policyholders, types of policies, claim and underwriting histories, inquiries about new products whether in existence or not, and all other elements and components about the presently insured. This can also extend to previously existing policyholders and causes for cessation of coverage. This initialization process starts to fill in the fields with known information and data. Gaps in the fields will be progressively filled in over time as inquiries are made and policies are reviewed, written, declined or cancelled, and renewed.

STEP 3. Identify source of initial contact, inquiry and input. This contact may be by mail, on-line, referral, telephone, or other inquiry type. Use tagging ID that relates to possible previous coverage, existing coverage, and/or potential coverage. A piece of existing information can start the fill-in process but operator still requests information to compare, revise, and update the records bases. The tagging ID connects to potential records as past and present account and policy numbers, otherwise it generates new ones.

STEP 4. Collect, verify, maintain, update and backup names of policyholders, their physical addresses, telephone numbers, email addresses, and Social Security Numbers or Tax Identification Numbers, and other identifiers.

STEP 5. Collect, verify, maintain, update and backup names of property or right owner(s), their physical addresses, telephone numbers, email addresses, and Social Security Numbers or Tax Identification Numbers, and other identifiers.

STEP 6. Collect, verify, maintain, update and backup policyholder(s) mailing addresses.

STEP 7. Collect, verify, maintain, update and backup property or right owner(s) mailing addresses.

STEP 8. Collect, verify, maintain, update and backup policyholder(s) TIN or SSN.

STEP 9. Collect, verify, maintain, update and backup property owner(s) TIN or SSN.

STEP 10. Collect, verify, maintain, update and backup additional verification database(s).

STEPS 1-10 start the initialization and the installation process and introduce the necessary information to identify the policyholder(s) and property owner(s). These steps are for account administration and management as well as to comply with various laws and acts, as well as internal compliance purposes.

STEP 11. Collect, verify, maintain, update and backup point property database(s). This narrows the focus on the insurable object, space, property or right.

STEP 12. Collect, verify, maintain, update and backup spatial location(s) and descriptions. This focuses on properties that have spatial aspects.

STEPS 11-12 provide the insurer with databases that define properties and rights both from location and spatial perspectives.

STEP 13. Collect, verify, maintain, update and backup information about Trusts, Special Purpose Vehicles (SPVs), Special Investment Vehicles (SIVs) and other entities to see structure and possible other interests and cross-collateralization(s).

STEP 14. Collect, verify, maintain, update and backup lien holder(s) and mortgage interests. This focuses on potential other parties that may have an interest in the property.

STEP 15. Collect, verify, maintain, update and backup judgment holder(s) data to determine other claims against property.

STEPS 13-15 enable the insurer to determine if there are other claims against the property that may have priority.

STEP 16. Collect, verify, maintain, update and backup tax records.

STEP 17. Collect, verify, maintain, update and backup Parcel ID database.

STEP 18. Collect, verify, maintain, update and backup Area database.

STEP 19. Collect, verify, maintain, update and backup Acreage, lot size, spatial databases.

STEP 20. Collect, verify, maintain, update and backup School District, Venue databases.

STEP 21. Collect, verify, maintain, update and backup Roll Section of tax records.

STEP 22. Collect, verify, maintain, update and backup bank and mortgage company records not only for loans but servicing as well.

STEP 23. Collect, verify, maintain, update and backup escrow databases. This lists what is escrowed, how much is in escrow, and the escrow fiduciary. It provides information as to any other insurer interest in the property.

STEP 24. Collect, verify, maintain, update and backup property class. This lists what type of property it is, such as, single family house, multiple family dwelling, condominium, commercial, educational, religious, government, vacant land, commercial, multiple use and so forth.

STEP 25. Collect, verify, maintain, update and backup exemptions database. This shows if there are whole, partial or no exemptions on the property. These exemptions can be due to non-profit status, veteran, senior citizen, or preferential tax treatment to encourage development and usage. There can be other reasons for exemption.

STEP 26. Collect, verify, maintain, update and backup variance and zoning databases. This lists the status and changes in the properties.

STEP 27. Collect, verify, maintain, update and backup interests and rights databases. This shows recordings of any divided interests or other participants in the property as well as satisfactions of previous open issues.

STEP 28. Collect, verify, maintain, update and backup bond and warrant book database(s).

STEP 29. Collect, verify, maintain, update and backup Deed book database.

STEPS 16-29 enable the insurer to inspect, analyze, develop and use for pricing and underwriting different books and records maintained by local taxing authorities and clerk offices. These records also give an indication of the cost of carry from a tax perspective for the property. Property taxes are generally imposed regardless of income though there are some exceptions as for seniors, veterans, and different income levels. This variation for income levels typically occurs where there is a school tax rebate or refund plan.

STEP 30. Collect, verify, maintain, update and backup title insurance database and claim history, if any.

STEP 31. Collect, verify, maintain, update and backup down payment database. This gives an indication of what the initial down payments were on the property. Over time properties may be re-financed and even cashed out. Nevertheless, it develops a history for certain properties, buildings, and areas. Some residential buildings are all cash and cash only. This exclusivity requirement precludes mortgages and potential mortgage issues.

STEP 32. Collect, verify, maintain, update and backup initial equity database. This is related to STEP 30 but it takes into account deeded interests, inherited stakes, subsequent development on paid-in-full land and so forth.

STEP 33. Collect, verify, maintain, update and backup the estimated equity database(s). This estimate gives an indication as to how much, if any, equity is held by the property owner.

STEP 34. Collect, verify, maintain, update and backup estimated debt database(s). This completes the financing picture and financial status for a given property. Depending on market conditions, the property if sold immediately could be in a situation known as a short sale whereby the sale proceeds are insufficient to payoff the outstanding debt.

STEPS 30-34 give an indication as to potential title imperfections, claims, clouds or other impediments in case of a sale. Also, these steps provide an indication of the financing on the property and trends in debt, equity and market value.

STEP 35. Collect, verify, maintain, update and backup assets database(s). This lists if there are other properties, structures or collateral.

STEP 36. Collect, verify, maintain, update and backup liabilities database(s). This lists if there are other liabilities or claims against the structures or other assets.

STEP 37. Collect, verify, maintain, update and backup other properties or rights database(s). These can be properties or rights external or internal to the subject property.

STEPS 35-37 bring in other financial parameters to improve the understanding and process.

STEP 38. Collect, verify, maintain, update and backup other coverage(s) databases. This shows what other kind of other coverage is on that property as well as other policies held by the owners and/or policyholders. It is demonstrated that by combining different policies and bundling different risks the cost structure for insurance of the present invention coverage can decline. This best mode lowers premiums because an insurer is not insuring concentrated risks such as macroeconomic or mega events but bundled or diluted risks in solution.

STEP 39. Collect, verify, maintain, update and backup new interests, variants databases. This step incorporates new interests and variants in the composition of the property.

STEPS 38-39 enable the insurer to have a more comprehensive view of the total risk profile for the property as well as its owner. If there are additional policies with the insurer this may improve the premium outlook for the insured.

STEP 40. Collect, verify, maintain, update and backup improvements database. This parameter may alter the outstanding replacement value or market value or both depending on the language of the policy. It may turn out that the microeconomic insured property or structure received higher limits but the macroeconomic insurance of the present invention coverage remained constant. This is subject to recalibration.

STEP 41. Collect, verify, maintain, update and backup damages database(s). This is a potential offset to STEP 40. It also influences any subsequent claim either for structure or market value.

STEPS 40-41 are potential offsets of one another and are used for market value and coverage limits. These parameters relate to recalibration and provide quick capital revisions for the property.

STEP 42. Collect, verify, maintain, update and backup ON/OFF data. ON/OFF is a switching mechanism as to whether coverage is on or off for a particular period. This relates to the temporalities yet gives a quick view or executive summary of coverage, particularly insurance of the present invention that is ON or OFF at that moment or a specified time period.

STEP 43 Collect, verify, maintain, update and backup ODDS/EVENS. This is another quick view or executive summary of insurance of the present invention coverage during odd or even time spans, such as ODD or EVEN years. It is the first step in dividing temporalities that alter the time and probabilistic space.

STEP 44. Collect, verify, maintain, update and backup Decimals. This is a temporal variant related to ODDS/EVENS. Time periods can be differentiated by the endings, such as 0, 1, 2, 3, 4, 5, 6, 7, 8, 9. This ten-part division can be further subdivided. Where ODDS/EVENS splits the insurance space in half, the Decimals reduces the space by 90 percent. That is derived by the 0 to 9 endings of which there are 10 in all. Therefore each span is only 10 percent. This is significantly much easier to treat but requires considerable computational power.

STEP 45. Collect, verify, maintain, update and backup SET/RESET. This refers to the setting of the policy and the potential resetting of coverage after an event.

STEP 46. Collect, verify, maintain, update and backup recalibration. This concerns built-in, or automatic increments or decrements in coverage, particularly against the structure. It relates to a formulaic adjustment for appreciation, depreciation, depletion, accretion, and other increases or decreases.

STEP 47. Collect, verify, maintain, update and backup configuration database(s). This relates to the configuration of the property or properties. It focuses not only on the elements but the configuration or arrangement. Some configurations or arrangements are better than others.

STEPS 42-47 refer to different timing or switching devices that define temporalities from a quick view transformation of the risk space given various divisors. The recalibration and configuration databases are formulaic value adjusters.

STEP 48. Collect, verify, maintain, update and backup GPS coordinates and database(s). This step measures terrain and spatial properties, boundaries, paths, orbits, routes, and other identifying features. This can be for a simple plot of land to an irregularly shaped property that has variable topographical features. It also pan pinpoint location and space measurements for satellites and their orbits and so forth. This is used to construct visual images and maps of the insurer's risks, properties insured, and risk profile planes and solids.

STEP 49. Collect, verify, maintain, update and backup bandwidth(s) and databases.

STEP 50. Collect, verify, maintain, update and backup virtual or cyberspace database(s).

STEP 51. Collect, verify, maintain, update and backup special qualities of property database(s).

STEP 52. Collect, verify, maintain, update and backup jurisdictional body (-ies) database(s). From an image and mapping perspective the insurer can determine potential jurisdictions and/or conflicting jurisdictions. Useful in seeing if there is country or political risks too. For example, some properties may be located in countries that are nationalizing businesses, properties, or restructuring contracts. Also, gives quick view of currencies and currency risks.

STEP 53. Collect, verify, maintain, update and backup imaging and mapping database(s). At the outset can use what is commercially available and depending on coverage amount can incorporate other images and mapping pieces. The costs may be paid by the insured as part of the process.

STEP 54. Collect, verify, maintain, update and backup price conveyed database. There is more to this than just price. There may have been tax-free exchanges, eminent domain issues, transfer into a trust, step-up or even step-downs due to death, and other considerations.

STEP 55. Collect, verify, maintain, update and backup price assessed, appraised database(s). Price or market value assessed databases are partially from taxing authority records and the underwriting process.

STEP 56. Collect, verify, maintain, update and backup current market estimate database(s). This information is collected from a variety of sources such as local, regional and national indexes and averages. The usage of mapping and comparative mapping whereby past, present, and estimated futures values are compiled, computed and compared. This is important to consider in the evaluation option-like premiums given a range of deductibles.

STEP 57. Collect, verify, maintain, update and backup the agent and broker database(s). This is the actual agent or broker who introduced the prospective or actual policyholder. This is a narrow database that refers to the agent/broker that is printed on the invoices and coversheets of the policies. It is also used for commission and compensation purposes.

STEP 58. Collect, verify, maintain, update and backup underwriting. These are the available underwriters and the actual underwriter(s) who can manage and did manage this process for the prospective or actual written policy.

STEP 59. Collect, verify, maintain, update and backup survey database(s). Over time the images and maps will complement the surveys and reports. Both can be used for validation purposes.

STEP 60. Collect, verify, maintain, update and backup the area and spatial mapping database(s). This is a global concentric version.

STEP 61. Collect, verify, maintain, update and backup special features database(s). This indicates special qualities or impediments about the property or its surroundings.

STEP 62. Collect, verify, maintain, update and backup other database(s). These other databases may concern oil leases, pipelines, easements and other relevant data.

STEPS 48-62 enable the description, definition, layout, structure and arrangements of the property or properties. This information is also used for mapping, policy and risk mapping.

STEP 63. Collect, verify, maintain, update and backup policy (-ies) numbers and identifiers. These may be alphanumeric, numeric or other identifier. The policies are past, present and prospective. The policy is basically the document or contract that defines the parties, property, rights, coverage, events, and processes and procedures for filing a claim or appealing a claim. It describes the coverage, the premiums, the terms and now other temporalities, sub-, intermediate-, and super-scripting parameters.

STEP 64. Collect, verify, maintain, update and backup account number(s). These may be alphanumeric. These are identifiers.

STEP 65. Collect, verify, maintain, update and backup review and review history and reports. This is information, analyses and commentaries.

STEP 66. Collect, verify, maintain, update and backup accept::conditionally history and reports. This is further information, analyses, and commentaries.

STEP 67. Collect, verify, maintain, update and backup decline history and reports. This is information, analyses, and commentaries that indicate why there was a decline of coverage. It concerns history, prior claims, cancellations and so on. It can also indicate that too much coverage is already outstanding in that area, region, market or event class.

STEP 68. Collect, verify, maintain, update and backup renew::conditionally history and reports. This is further information, analyses, and commentaries.

STEP 69. Collect, verify, maintain, update and backup prior or related claims databases. This is further information, analyses, and commentaries that are focused not only on the insured, but the property itself and related or local properties. It conditions the analysis and probably structures.

STEP 70. Collect, verify, maintain, update and backup regulatory and compliance databases. This concerns licensing not only for agents, brokers, branches, business entities but registrations, filings and reporting to different regulators and jurisdictions. It also maintains a list of actions, venues and parties. This section is encompasses legal and other compliance aspects.

STEPS 63-70 are intermediate steps that may be filled in by previous inquiries or policies. These steps are used to determine if there is a history of any sorts about the property, policyholder, and/or property owner. Depending on what is discovered, there may be significant changes in a policy offer if any. It is a provisional section in the process. It is due diligence and compliance oriented.

STEP 71. Collect, verify, maintain, update and backup the series. The series is a subset or subsets.

STEP 72. Collect, verify, maintain, update and backup the classes. It is the entirety of the individual series or subsets per class.

STEP 73. Collect, verify, maintain, update and backup the participations. This refers to participation rates, if any, depending on product.

STEP 74. Collect, verify, maintain, update and backup stipulations and events. This is the exercise events, exclusion events, the cancellation events, the non-renew events, and other stipulations. Exercise events can be casualty loss, American, European, Binary or other option action cause. Events can be based on sale, exchange, transaction, partition, and financing or refinancing, change in use, death of one or more owners, and other conveyance or change in title.

STEP 75. Collect, verify, maintain, update and backup other variables, variants. This enables the system to adapt to evolving and emerging practices, parameters, and other changes in the insurance space. It is also used for scripting purposes.

STEP 76. Collect, verify, maintain, update and backup the temporalities. This is more than the start and end of the policy year or term, though that aspect is included. This step partitions the different and many time aspects such as phasing, skipping, rolling and other time spans for the calculation of option-type premium structures and coverage periods. It also accounts for ODDS/EVENS, OFF/ON, SET/RESET. All these are then used as components or building blocks of the insurer's risk profile and enable the operator and risk manager to determine what risks should be accepted and what risks should be declined. It is a multi-dimensional time or temporal representation of the policies. Also, time is a component of option pricing models and methods. It is very important to specify all the relevant time spans for the market value risk coverage. To reiterate, this splitting of time allows for mega or macroeconomic coverage as is now possible by the insurance of the present invention product and policy. It is another aspect and classification in the insurance space. Essentially, time is money whether valuing securities, options, other derivatives or insurance policies. To rephrase, time does not have to be continuous but it does have to be accounted for.

STEP 77. Collect, verify, maintain, update and backup deductibles and exclusions database(s). The deductibles both traditional and in the insurance of the present invention optionality sense define financial limitations of the coverage. These deductibles interact with allowable limits to range capture and mathematically define exactly what are the policy financial limits and parameters. This STEP interacts with STEP 76, temporalities, in order to generate premium prices. The time value of money and option pricing mechanisms are using the parsed time sets or temporalities for the time variable.

STEP 78. Collect, verify, maintain, update and backup other events database(s). This complements STEP 74 above. This extends the parameterization and allows for more extensive scripting particularly at the intermediate and superscript levels.

STEP 79. Collect, verify, maintain, update and backup parameters and boundaries database(s). This complements STEP 78 and furthers the usage of other databases to define and apply intermediate and superscript variables. This would be mega and/or macroeconomic events. It quantifies the regional, national and international levels, categories and trends in interest rates, economic phases, inflation or deflation, weather, disasters and other such events. It also maintains volatility statistics and calculations for the historic, current, implied and expected levels. Then these statistics and probabilities can be applied for the individual policy and related risk pools. The interest rates and yield curves are variables to calculate the time value of money, the premiums, the premium structures and serve as benchmarks for income and return on investments or alternative uses.

STEPS 71-79 enable the tabulation and maintenance of databases that are used for subsequent underwriting, scripting, calculating pricing/premium structures, mappings and other parameterizations. These steps also provide the data for the calculation of policy premium via option, time value, and expectational models. Option models have two basic formulations in order to determine the premiums for the two basic types of option: Puts and Calls. Option models incorporate a strike or exercise price, the underlying property or index price, a volatility or variance type statistic, such as a standard deviation or range, that quantifies the degree of risk, the term of the option, and interest rate or rate structure, and cash flows, if any. Cash flows can be dividends or interest payments, or they can refer to rents or other income streams, all of which may be implied or explicit.

Here, the underlying would be the designated market value of the structure, land, structure and land, property, right and so on. The time to expiration is split and multiple unlike ordinary listed options. There is more than one operating at the same time. Here, there is the policy year, the ODD/EVEN switch and other temporal configurations. Moreover, the event horizon can trigger an effective exercise that is outside the typical exercise and term conditions of regular known options. Included in this event horizon are sale, damage causes, death, conveyances and other items. The deductibles and financial boundaries of coverage are used in a manner similar to strike prices but on a heterogeneous basis. The interest rates and related yield curves then are used to compute various time values. Likewise, the data collected in these steps is used to construct volatility estimates and parameter values. These volatility statistics will be subjected to time forces and changes. Moreover, the volatility statistics which are proxies for risk can now be entered on a microeconomic or individual subscript level, and intermediate or regional script level, and on a mega or macroeconomic superscript levels. These multiple scripting levels now allow for quantitative comparisons across risk classifications. Cash flows, if any, relate to income streams, interest payments, dividends, or rents whether they are implicit or explicit. Compounding the situation are currency exchange rates.

In general, insurance policies whether customary or not, have some sort of a put-like feature. Properties tend to be insured against negative downside events. Here, there can have various and multiple configured puts, calls, deductibles or strikes, timing features, and other aspects.

Now the property holder can acquire a product, the policy or services related thereto, in order to better risk manage the situation. This risk management methodology dampens or eliminates the financial risk exposure to previously uninsured or underinsured risks depending on insurable object, property or right via a premium.

STEP 80. Collect, verify, maintain, update and backup interface systems manager and protocols. This also includes security, privacy, access and encryption. The interface allows functionality among various legacy systems and external databases and systems. It enables the flow of data and information. As with many other products and systems within the broad financial industry, including but not limited to banks, securities and derivatives brokers, markets and exchanges, third party pricing services, insurers, reinsurers, clearing houses and other institutions each of which has its own internal system. Within these systems there may be legacy systems due to regional, national or international companies, affiliates and related parties. This could occur because of mergers and acquisitions or local needs and purposes. Nevertheless, connectivity is important even for private or seemingly closed systems. The seemingly closed system can be sender only, or receiver only, or limited to sending and receiving between or among particular users, devices, and authorization protocols. The Insurance Transaction System has the openness to operate with other systems including pricing and risk management systems. It can run separately with all necessary inputs entered manually or technologically; or, it can run parallel or in tandem with the different systems, inputs and outputs. The interface is built with what is available and what is required. The parameters and methodologies are described.

STEP 81. Collect, verify, maintain, update and backup insurers database(s). This means that the insurer's databases are backed-up as well as outside insurers in the context and matter of insurance of the present invention or other multiple party policy underwriting. It is an overlapping data and coverage set. This provides cross-sectional perspective and risk dimension.

STEP 82. Collect, verify, maintain, update and backup reinsurer's database(s). This means that the insurer's databases are backed-up as well as outside reinsurers in the context and matter of insurance of the present invention or other multiple party policy underwriting and reinsurance. It is an overlapping data and coverage set. This provides cross-sectional perspective and risk dimension.

STEP 83. Collect, verify, maintain, update and backup agents/brokers database(s). This lists the agents/brokers who are authorized to solicit business for this and other products. It shows their primary, secondary, and tertiary lines of business. It lists which licenses they hold and for what jurisdictions. It also shows if they have satisfied the education and continuing education guidelines. It has names, addresses, and points of contact such as telephone numbers and emails. This list shows who is in proximity or available to meet the prospect or client. Also, it supports the distribution of leads.

STEPS 80-83 describe the interface and connectivity issues for managing the process of soliciting, marketing, selling and servicing the policies and services. The interface systems manager also relates, interacts and connects to STEP 1 and STEP 2. Here, the appropriate technicians and specialists are called upon to keep the technology running smoothly. They can address the other STEPS as well in terms of technological functioning, updates, and other performance issues.

STEP 84. Collect, verify, maintain, update and backup and send to underwriting databases. This is different than STEP 58.

STEP 85. Collect, verify, maintain, update and backup premium(s) database(s). This is a multi-stage step, procedure and process. The premiums are the costs or amounts as indicated on the policy as well as the calculated option-like premiums according to model specifications. Also, the inclusion of other policy coverage premiums expands the possible solution set. The policy premium should be greater than the option premium in order to produce a positive expected value to the insurer. This policy premium takes into account not only the underwriting but also the computation of the option features and events. The pricing or premium differences between the policy premium and the option premium constitute a spread out of which commissions, compensation and other administrative and operating expenses are paid. There are real, actual and likely results that the constructions of a synthetic options or derivatives position to risk manage an actual position results in a so-called "free" or no cost strategy. This is because of the offsets of the options time values. In the case of a homeowner who was extremely risk adverse that they could not tolerate any down-side market risk, some options pricing models would show that the synthetic short position or insurance coverage nets out the premiums of the purchased at-the-money put versus the sale of the at-the-money call requiring no premium so to speak. There are other variants as well. However, due to margining rules, there would be a placement of margin monies to transact and maintain the position. In general, models such as option models calculate what is called FAIR VALUE, the value at which there is no arbitrage. It is singular. However, markets such as securities, futures, options, derivatives, real estate and so on have bids and asks or bids and offers and transaction prices as well as fair value prices or premium structures. Fair value is akin to an appraisal; it is an indication of value, but not necessarily the value itself. A transaction is a market value that needs to be considered in the context of time. Market makers, banks, underwriters, retail stores, brokers, other business owners and insurers depend on the spread or net margin to profit. Continuing with the embodied description about the risk adverse homeowner, they would still be charged a premium for coverage that would be the spread plus the fair value. This covers the insurers costs.

The policy premium stream of income is used to pay claims and preferably add to the investment or reserve base of the insurer.

STEP 86. Collect, verify, maintain, update and backup options database(s). The option databases include different pricing models, generic or known, and others that are proprietary and not known to the outside world. Items such as option premiums for related calls and puts, strike or deductibles, temporalities The models can be Black, Black-Scholes, Binomial or other formulations including proprietary formulations. While different models have different premiums or expected values at various times, the terminal value, if any, should be the same regardless, especially at the end, termination or exercise event. Different models account for European, American or blended forms. They can be particular to dividend pay, interest pay, futures, bonds, stocks, indices and so forth. They can be adapted to income or rental streams too. Nevertheless, simple form models have many efficiencies and advantages in terms of computational valuations and re-evaluations, particularly on a real-time transaction and risk management basis. In practice, unbiased samples should sum out the error or tracking terms. If there are large errors, system crawl, or cumulating errors, then the models need to be reset or revised. It is an ongoing process. It should be noted that the system is dealing with a myriad of unique policies and option characteristics and not many contracts for a few options or maturities.

STEP 87. Collect, verify, maintain, update and backup the structures database(s). This refers to the arrangement, sets, and subsets of coverage, option configurations, and synthetic position configurations.

STEP 88. Collect, verify, maintain, update and backup types databases(s). This refers to the put and call structures as well as synthetic market directional positions. It provides a different view. As an analogy two people are looking at the same mountain. One looks towards the north and the other looks towards the south. They see different views and risks. With these multiple views an insurer and risk manager can more efficiently and effectively manage the elemental and composite risks.

STEPS 84-88 described the construction, process and usage of various premiums and premium structures not only at one point in time but across time. Various option models can be used from simple forms to complex evaluators. On a practical basis for day-to-day operations, comparatively simple models best evaluate numerous positions. This is particularly true for real-time applications. However, more sophisticated models can be used as checks against the positions to determine validity and stability.

STEP 89. Collect, verify, maintain, update and backup the send to pricing step. If there is an inordinate delay to get to this point during which market conditions changed rapidly, there may have to be administrative intervention. Nevertheless, the pricing is the blending of all the policies and premium streams as well as the insurance of the present invention premium and insurance of the present invention option premium structure. When policies are aggregated across insurance lines this adjusts the overall policy premium.

STEP 90. Collect, verify, maintain, update and backup the admin or administrative pricing. This is an open alternative. If circumstances are such as to offer concessions so as to attract new business, the previous pricing and premiums can be adjusted. This is permits override adjustments and corrections.

STEPS 89-90 relate to the pricing and setting of policy premiums. STEP 89 can end the pricing process whereas STEP 90 enables concessions or adjustments on an authorized manual or technological basis. If there are no adjustments the process continues to the next stage and STEPS.

STEP 91. Collect, verify, maintain, update and backup Final Review. At this point, the operator decides as to whether to: Accept, Decline, Cancel, Defer, or Renew the policy.

STEP 92. Collect, verify, maintain, update and backup decline, cancel decision and send notice to agents/brokers and the client or prospect. The notice indicates either a decline or cancellation.

STEPS 91-92 detail the final review and decisions. If coverage is declined or cancelled then notice is sent to the prospect or client as well as to the agents/brokers.

STEP 93. Collect, verify, maintain, update and backup and send to Global database of insurance of the present invention. This is the process and method whereby the insured properties or rights are individually tagged with unique ID#'s, scripts are attached to parameters, additional identifying and measuring occurs if partitions or other changes occur to properties under coverage with insurance of the present invention.

STEP 94. Collect, verify, maintain, update and backup insurance ID#. Policy is approved for new coverage or renewal. The insurance ID# is a device that can be alphanumeric or other form that uniquely identifies the policy and property covered by insurance of the present invention. It is similar to a CUSIP or Tax Identification Number, security or derivatives symbol.

STEP 95. Collect, verify, maintain, update and backup the type. The type is the progressive scripting of type of property or right that is now covered. Since existing databases were used in the system initialization process, there was no or limited scripting of parameters. Also, there was no insurance product of insurance of the present invention. Now as policies are reviewed, written or rejected a history or time series is created and developed. As more policies are written, the greater is the depth and breadth of the different time series and scripts. Therefore policies can be written at the outset with comparatively less information yet the process and system starts to feedback on the converging data and information.

STEP 96. Collect, verify, maintain, update and backup location. This refers to the property or right. The location can be real estate, land, structure, and land and structure, it can be virtual or cyberspace property, it can be locations and orbits of satellites and other craft and so on. The system transforms the insurance plane of length and width into a space that takes into account depth and multiple temporalities. Whether a tanker or satellite the location may vary according to time and movement. Therefore there are different paths, routes or rights-of-way.

STEP 97. Collect, verify, maintain, update and backup subsets #'s. These are the parameters and scripts that indicate mega or macroeconomic, intermediate, and individual or microeconomic events and conditions. It categorizes parameters such as yield curves as to whether they are inverted, flat, positive or humped. It indicates whether overall prices are rising, stable, or declining across the board or specific asset classes. It indicates high, middle, or low-income groups. It categorizes advancing, flat or declining price trends for different neighborhoods, communities, cities, states or provinces, regions, and countries. These scripted parameters conditionalize the process and pricing mechanisms. This is especially necessary for the larger or macroeconomic risks. These risks have different aspects. They can be indexed and multiplied against the raw numbers or results. These newly scripted parameters provide a risk-adjusted view. The system can function without this process because it accounts for it and treats it on an unconditional default basis. This means that the risk adjustment multiplier is 1.0000 or one. Therefore whatever number, price, premium et cetera is inputted and operated on it is its identity. For example, suppose only one national variable is considered, price levels. If the potential premium is $2,000 and prices are rising at three percent per annum then the macroeconomic overall price level adjustment would indicate a factor of 1.03 for an adjusted premium of $2,060. That is, 2,000 times 1.03. If prices were declining by 5 percent per annum would indicate a premium of $1,900. This is computed by multiplying the 2,000 by 0.95. The default or unconditional result would be computed as 2,000 times 1.0000 or $2,000.00. These risk adjustment factors are applied to reflect the insurer's risk. Greater risks mean higher premium adjustment. When protection is provided to a property owner against downside market value, then the risk factor would increase the policy premium. The mechanics of this are accounted in the option stage. It is sufficient to state here that higher volatilities generate higher premiums on both sides. Higher volatilities increase put and call premiums and lower volatilities reduce put and call premiums. Further macroeconomic overlays and risk adjustment enhance the process and system.

STEP 98. Collect, verify, maintain, update and backup A/B file. This alerts the agent or broker as to the acceptance of the policy and credits them according to their commission or compensation schedule.

STEP 99. Collect, verify, maintain, update and backup and send to risk manager. Once the insurance of the present invention product is sold, its risk profile needs to be managed. Therefore it goes to the risk manager.

STEPS 93-99 manage the database of insurance of the present invention that has marked or identified properties, rights, paths, locations, and spaces. It accounts for types, locations, subset #'s, agent and broker compensation credits, and directs the new property to the risk manager.

STEP 100. Collect, verify, maintain, update and backup PRINT POLICY. The policy is printed for delivery to the policyholder. The policy is also stored at the operator's location.

STEP 101. Collect, verify, maintain, update and backup deliver policy and policy declarations. The policy is delivered to the policyholder.

STEPS 100-101 are the notification and delivery of the written policy to the policyholder. As new declarations are written and policies renew these steps inform the policyholder.

STEP 102. Collect, verify, maintain, update and backup claim filed, send to adjuster. This step processes claim submissions. It directs claims and adjuster to process and resolve filed claims.

STEP 103. Collect, verify, maintain, update and backup claim disposition. This step administers claim rejection, acceptance, and payment. It is also used for appeals, arbitration or litigation.

STEPS 102-103 refer to the claim submission, processing, accept or reject, and pay claim procedures in accordance with the insurer's protocols.

STEP 104. Collect, verify, maintain, update and backup COMMENTS. This step allows the operator or others involved in the processes and operation of the system to post notes, comments and other information.

STEP 105. Collect, verify, maintain, update and backup ADDITIONAL DESCRIPTIVES. This step enables the creation, development and management of additional product, service, and system descriptives.

STEP 106. Collect, verify, maintain, update and backup CREATE ADDITIONAL LINES, SPACES. This step enables the creation of new lines, rows, vectors or columns, fields and spaces to accommodate new data development and uses.

STEPS 104-105 refer to the maintenance, future development and commentary about the system, processes, procedures, steps and stages, mechanisms, products, and ideas.

STEPS 1-106 as well as other sections in this filing describe the various processes, products, mechanisms, databases, and methods within the system. These processes can be and are expected to be functioning separately and at the same or other times. The products are the policies, consulting services, the usage and interaction of the insurance system and method and pricing mechanisms, scripting of variables, and the splitting of time and creation of multiple temporalities and other new parameters to accommodate this new insurance space. It has its own database. Customary steps such as due diligence, marketing, underwriting, administration, risk management, investment management, servicing accounts and policyholders still continue but with novel insurance products, services, processes, mechanisms, methods and system.

Each step denotes an inclusion aspect. As the system is utilized more and better data and information is perfected by interrelated and comparative feedback mechanisms the level of optimality increases. In the absence of particular data, defaults or dummies can be used. The system functions with what is known now and previously and incorporates or embodies the innovations in the stated manners. These innovations can be used separately or jointly but are most effective when used together. The STEPS have been clustered to disclose how the methods, processes, and mechanisms function within the system. This clustering relates specific STEPS to one another within a processing or method stage. All these STEPS and stages relate and interact. Sometimes, the numbering was arbitrary for illustrative purposes because some of the numbered steps are simultaneous and require multiple inputs to solve or proceed. The alternative was to identically number such STEPS. Regardless, the staged sequence is functional and proper while providing a checklist of components.

If an insurer has a property owner profile and accounting of open policies, then the insurance of the present invention product can be bundled or combined with these other policies because of the blending in solution aspects of managing risks. It makes for a superior product because of incorporating different risk classes such as home, auto, life, commercial and so forth with home market value coverage. Now risks are transformed over time and blended at various scripting levels. This infuses diversifiable events into what was an isolated, nondiversifiable, insurance location or space.

The phasing in of these policies of insurance of the present invention allow the insurer to collect income in the form of a premium or bundled premium. It effectively buys time for the insurer to establish mega or macroeconomic event reserves. These premiums contribute to the investment base or reserves. If the insurer has other product lines then the risks of mega or macroeconomic events is diluted. If an insurer was solely interested in underwriting only policies according to insurance of the present invention for as many property owners at once, then the probabilistic and temporal space is such that one event can cause an insolvency event for the solitary coverage insurer and potentially the insured as well. In other words, the odds are against the success for a non-diversified insurer. While insurance of the present invention can exist in relatively small quantities for standalone, one-coverage insurers; it is better served across insurer and reinsurer pools.

From a simplified actuarial perspective, one insurance company could provide coverage for fire or some other localized physical damage events. The insurer has quantified the event horizon, in that for a specified timeframe so many houses are expected to be damaged and what the expected damages may be, presently unknown are exactly which ones. The insurance space, particularly for a mega or macroeconomic event is that many, most or all are going to be damaged concurrently, it is just the timing of when that event will occur that is unknown. One of the innovations of the present invention is the alteration of the temporalities to more manageable spaces or spans. This filing discloses the other innovations for the novel products and invention.

Computer, Database and Systems Architecture

The Insurance Transaction System and method can operate within a varied and evolving technological environment comprising but not limited to various records and databases such as: Public records, government records, proprietary records, insurance records, underwriting records, property records, securities records, derivative records, banking records, financial records, economic records, scientific records, court and judgment records, weather records, and other records and databases. Moreover, each insurer, subsidiary, affiliate, broker and agency of an insurer may have different formats. This applies to other parties as well. The devices, hardware, software, systems may vary yet for optimal benefit should interface whenever reasonably possible. Computer networks whether, global, corporate, private, individual, government and so forth can use a variety of personal computers; larger-, super-, or mainframe computers; workstations and leased processing; telephonic or other communication devices touch screens, personal digital assistants, voice recognition systems, software, legacy systems, GPS systems, and other technological devices, products and services.

In the absence of information each piece of data can be filled in manually. However, there are databases that have policyholder and other information. This information is then absorbed into the system via interfaces. At the beginning, the installation and initialization steps require an extra degree of diligence. As in other financial institutions that merge or acquire other institutions, all parties try to maximize the benefit of legacy systems and databases. Sometimes, rewrites are too expensive and not expedient for the interrupted continuation of business. Instead, systems are developed that run in parallel until operations are seamless and correct.

Here, the novel system and method of the present invention brings in, connects and updates as policy inquiries are made and policies are written. There are many protocols for data and systems and each has to be addressed one-by-one. Some jurisdictions are not computerized and that may require manual entry of property parameters, taxes, transactions and the related items. Once that is attained, the system and method of the present invention now has the data and information in computer useable form. The data, formats, parameters, scripting and other elements can also be transformed to adapt to technological changes.

Each step is an information and data collection step. For this invention, the actual computations and underwriting require data handling at various levels. As this occurs, the system self-improves and constructs its own unique database.

Potential or actual insured parties can make inquiries and view their coverage on-line. Agents, brokers and other authorized personnel can view policies and different files according to internal access protocols. These viewings and interactions can occur with a plurality of compatible devices.

Functions of the Insurance Transaction System and Method

The functions of the Insurance Transactions System and Method of the present invention are many. At the beginning, it time stamps the process and steps within the process. It identifies the insurable property, the insurable space whether regular or irregular, the insurable time frames whether regular or irregular, property owners, policyholders and relevant databases and variables. Then it measures and defines various histories, underwriting results and flags, if any. It takes what is known and then proceeds to calculate, analyze and determine whether policies should be offered and at what terms and conditions. The system can function at different levels or capacities. As more data and information is inputted and developed greater efficiencies occur. For example, the implementation of multiple scripts, improves the process. As the system migrates and absorbs different levels or orders of scripts such as subscripts, intermediate scripts, and superscripts, it processes different risks, risk profiles, individual, intermediate and mega events and conditions and premium structures.

The complexity of the option calculation space is due to not only the multitude of unique properties and space in a non-standardized setting, but also the multitude or plurality of coverage levels, deductibles, time frames, stacking and stripping of individualized spreads, cash flows, interest rates, expectations, ODDS/EVENS, RESETS, and other inputs. The magnitude of even this option-like aspect dominates industry practices in more standardized brokerage operations be that for securities, derivatives, banking or traditional insurance. In other words, the insurer is providing a conventionalized product within a changing non-standardized environment that consists of homogeneous and heterogeneous aspects. When compared to ordinary securitization, whereby a listed security trades on an exchange and the shares are fungible and processed through a clearing corporation, the insurer is operating in a different environment.

The complex space and the staggered, parsing and other temporalities create new variations, products, opportunities and risk profiles. This dramatic expansion in the mathematics particularly the probabilities, outcomes, expected values and premium structures requires sufficient computational power and skills. The insured sees the final, end product, the policy. The path, processes and system to achieve that end require sophistication and technology. The insurer is now calculating multi-dimensional products across altered time and probability spaces, not simple time and singular probability points. However, this disclosure can be implemented by one of ordinary skill in the art.

Moreover, different feedback functionalities enable a progressive improvement in parameterization and product. To provide the desired coverage, the users, operators and insured parties can step into the process and make use of legacy systems. In fact, the temporal variable and step-in procedure is optimal for different risk classifications such as macroeconomic or mega coverage versus customary insurance coverage.

Regardless of the order of the implementation, the scripting, temporalities and other innovations in this invention increase and optimize the insurance space. Therefore, the implementation of even one innovative aspect of the invention improves the best mode. Plural implementations magnify the superiority of the invention and its best mode and applications relative to industry practices and standards.

There are other examples, embodiments, cases, and usages that are covered by the language of this patent filing. These examples, embodiments, cases and usages are as diverse and unique as the individuals, properties, rights and spaces. Whether there is one, ten, a million or more policies, these policies are based on specific locations, spaces, rights and parties. Furthermore, this invention can be applied to commoditized or ordinary properties and rights and traditional insurance and instruments. While many of the examples related to housing and unique properties, the product is intended for a vast scope of insurable properties, rights, spaces, and other formulations. Thus, the invention claims any and all modifications, variations, adaptations, formulations, implementations, applications and usages that constitute the space, scope and intent of the invention, its concepts, methods and other processes and functionalities.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

TABLE 1

Insurance Transaction System

| Aspects | One | All | Submitted | Compared | Diffs |
|---|---|---|---|---|---|
| source of initial contact, inquiry | | | | | |
| tagging ID# | | | | | |
| name(s) of policyholder(s) | | | | | |
| name(s) of property owner(s) | | | | | |
| physical address of policyholder(s) | | | | | |
| physical address of policyholder(s) | | | | | |
| physical address of policyholder(s) | | | | | |
| physical address of policyholder(s) | | | | | |
| physical address of property owner(s) | | | | | |
| physical address of property owner(s) | | | | | |
| physical address of property owner(s) | | | | | |
| physical address of property owner(s) | | | | | |
| property location(s) | | | | | |
| property location(s) | | | | | |
| property location(s) | | | | | |
| property location(s) | | | | | |
| property location(s) | | | | | |
| property location(s) | | | | | |
| property location(s) | | | | | |
| property location(s) | | | | | |
| mailing address of policyholder(s) | | | | | |
| mailing address of policyholder(s) | | | | | |
| mailing address of policyholder(s) | | | | | |
| mailing address of policyholder(s) | | | | | |
| mailing address of property owner(s) | | | | | |
| mailing address of property owner(s) | | | | | |
| mailing address of property owner(s) | | | | | |
| mailing address of property owner(s) | | | | | |
| policyholder(s) phone number(s) | | | | | |
| property owner(s) phone number(s) | | | | | |
| email address(-es) of policyholder(s) | | | | | |
| email address(-es) of property owner(s) | | | | | |
| tax id (TIN), soc sec # (SSN), holder(s) | | | | | |
| tax id (TIN), soc sec # (SSN), owner(s) | | | | | |
| additional verification database(s) | | | | | |
| point property database(s) | | | | | |
| spatial location(s), description(s) | | | | | |
| Trusts, SPV database(s) | | | | | |
| lien holder(s) and mortgage database(s) | | | | | |
| judgment holder(s) database(s) | | | | | |
| tax record(s) database(s) | | | | | |
| Parcel ID database(s) | | | | | |
| Area database(s) | | | | | |
| Acreage, lot size, spatial database(s) | | | | | |
| School District(s), Venue databases | | | | | |
| Roll Section | | | | | |
| Bank database(s) | | | | | |
| Escrow database(s) | | | | | |
| Property Class | | | | | |
| Exemptions database(s) | | | | | |
| variance and zoning databases(s) | | | | | |
| interests, rights database(s) | | | | | |
| bond and warrant book database(s) | | | | | |
| Deed book database(s) | | | | | |
| title insurance database(s) | | | | | |
| down payment database(s) | | | | | |
| initial equity database(s) | | | | | |
| estimated equity database(s) | | | | | |
| estimated debt database(s) | | | | | |
| assets database(s) | | | | | |
| liabilities database(s) | | | | | |
| other properties or rights database(s) | | | | | |
| other coverage(s) database(s) | | | | | |
| new interests, variants database(s) | | | | | |
| improvements database(s) | | | | | |
| damages database(s) | | | | | |
| ON/OFF | | | | | |
| ODD/EVEN | | | | | |
| DECIMALS | | | | | |
| SET/RESET | | | | | |
| recalibration | | | | | |
| configuration database(s) | | | | | |
| GPS coordinates and database(s) | | | | | |
| bandwidth(s) and databases | | | | | |
| virtual space database(s) | | | | | |
| special qualities of property database(s) | | | | | |
| jurisdictional body(-ies) database(s) | | | | | |
| imaging and mapping database(s) | | | | | |
| price conveyed database(s) | | | | | |
| price assessed, appraised database(s) | | | | | |
| current market estimate database(s) | | | | | |
| agent/broker database(s) | | | | | |
| underwriting | | | | | |
| survey database(s) | | | | | |
| area and spatial mapping databases(s) | | | | | |
| special features database(s) | | | | | |
| other database(s) | | | | | |
| policy (-ies) number(s) | | | | | |
| account number(s) | | | | | |
| review | | | | | |
| accept::conditionally | | | | | |
| decline | | | | | |
| renew::conditionally | | | | | |
| prior or related claims database(s) | | | | | |
| regulatory, compliance database(s) | | | | | |
| series | | | | | |
| classes | | | | | |
| participations | | | | | |
| stipulations, events | | | | | |
| other variables, variants database(s) | | | | | |
| temporalities | | | | | |
| deductibles, exclusions database(s) | | | | | |
| other events database(s) | | | | | |
| parameters and boundaries database(s) | | | | | |
| interface systems manager | | | | | |
| insurers database(s) | | | | | |
| reinsurers database(s) | | | | | |
| agents/brokers database(s) | | | | | |
| send to underwriting database(s) | | | | | |
| premium(s) database(s) | | | | | |
| options database(s) | | | | | |
| structures database(s) | | | | | |
| types database(s) | | | | | |
| send to pricing | | | | | |
| admin pricing | | | | | |
| Do final review::Accept, Decline, Defer, Renew | | | | | |
| If decline, cancel send notice | | | | | |
| send to global | | | | | |
| ID # | | | | | |
| type | | | | | |
| location | | | | | |
| subset #'s | | | | | |
| A/B | | | | | |
| send to Risk Manager | | | | | |
| PRINT POLICY | | | | | |
| deliver policy, declarations | | | | | |
| claim filed, send to claims, adjuster | | | | | |
| claim disposition | | | | | |

TABLE 1-continued

Insurance Transaction System

| Aspects | One | All | Submitted | Compared | Diffs |
|---|---|---|---|---|---|
| COMMENTS | | | | | |
| ADDITIONAL DESCRIPTIVES | | | | | |
| CREATE ADDITIONAL LINES, SPACES | | | | | |

I claim:

1. A method for providing insurance coverage, comprising the steps of:
    providing access to at least one database stored in a computer accessible memory device including information about a particular property or interest;
    utilizing information in the at least one database to create, with a computer, risk profiles over time, relative to insuring the particular property or interest;
    determining by a computer, using the risk profiles created, for a particular policy term of a first duration:
        two or more coverage periods in which insurance coverage is provided on the particular property or interest by a first insurer, the total duration of the two or more coverage periods being less than the first duration;
        at least a third coverage period in which insurance coverage is provided on the particular property or interest by a second insurer, the at least a third coverage period of the second insurer being different than the two or more coverage periods of the first insurer; and
    generating an insurance policy for the particular property or interest having the particular policy term and which provides coverage by only the first insurer during the two or more coverage periods determined and by only the second insurer during the at least a third coverage period determined, at least two of the two or more coverage periods being non-contiguous in time during the first duration.

2. The method of claim 1, wherein the insurance policy generated provides coverage by at least a third insurer on the particular property or interest for at least a portion of the period of time during the policy term not covered by the first insurer and second insurer.

3. The method of claim 1, wherein the first insurer and the second insurer are selected from a pool of potential insurers in the at least one database.

4. The method of claim 1, wherein the generating step includes generating the insurance policy for the particular property or interest in which insurance coverage provided by the first insurer and the second insurer, together, provide insurance coverage for the particular property or interest over the entire particular policy term of the first duration.

5. The method of claim 1, wherein a start of a first coverage period of the two or more coverage periods is deferred for a period of time after the start of the policy period.

6. The method of claim 1, wherein the timing of the two or more coverage periods during the policy term is determined by a switching device.

7. The method of claim 6, wherein the switching device is chosen from the group consisting of: 1) on or off; 2) odd or even; and 3) decimals or fractions.

8. The method of claim 6, wherein the switching device is one or more of scripting, skipping, phasing, temporalities, series expansion, odd-even, on-off.

9. The method of claim 1, wherein the coverage provided during the two or more coverage periods insures a market value of the particular property or interest, independent of any physical change to the particular property or interest.

10. The method of claim 1, wherein the two or more coverage periods in which insurance coverage is provided are determined using the risk profiles so as to reduce the liability to the first insurer by limiting the exposure of the first insurer to only the two or more coverage periods.

11. The method of claim 10, wherein the risk profiles are generated using data stored in the database relating to the liability exposure of the first insurer in the event of a catastrophic event.

12. The method of claim 1, wherein at least a portion of the two or more coverage periods of the first insurer are a plurality of coverage periods separated from one another by a period of non-coverage during the policy term.

13. The method of claim 12, wherein the occurrence of each of the plurality of coverage periods, and correspondingly, each period of non-coverage during the policy term is defined by a switching device.

14. The method of claim 13, wherein the switching device is at least one of on/off, odd/even and decimals/fractions.

15. A system for providing insurance coverage, comprising:
    at least one database stored in a computer accessible memory device including information about a particular property or interest;
    at least one computer in communication with said at least one database, said at least one computer utilizing data from said database to generate, risk profiles over time, relative to insuring the particular property or interest;
    said at least one computer being configured to determine, for a policy term of a first duration:
        two or more coverage periods in which insurance coverage is provided on the particular property or interest by a first insurer, the total duration of the two or more coverage periods being less than the first duration;
        at least a third coverage period in which insurance coverage is provided on the particular property or interest by a second insurer, the at least a third coverage period of the second insurer being different than the two or more coverage periods of the first insurer; and
    at least one computer being configured to generate an insurance policy for the particular property or interest having the particular policy term and which provides coverage by only the first insurer during the two or more coverage periods determined and by only the second insurer during the at least a third coverage period determined, at least two of the two or more coverage periods being non-contiguous in time during the first duration.

16. The system of claim 15, wherein said at least one computer is configured to generate a policy that provides insurance coverage by at least a third insurer on the particular property or interest for at least a portion of the period of time during the policy term not covered by said first insurer and said second insurer.

17. The system of claim 16, wherein said at least one computer is configured to select said first insurer and said second insurer from a pool of potential insurers in the at least one database.

18. The system of claim 15, wherein said at least one computer is configured to generate an insurance policy for the particular property or interest in which insurance coverage provided by said first insurer and said at least a second insurer, together, provide insurance coverage for the particular property or interest over the entire particular policy term of said first duration.

19. The system of claim 15, wherein a start of a first coverage period of the two or more coverage periods is calculated to be deferred for a period of time after the start of the policy period.

20. The system of claim 15, wherein the timing of the two or more coverage periods during the policy term is determined by a switching device.

21. The system of claim 20, wherein the switching device is one or more of scripting, skipping, phasing, temporalities, series expansion, odd-even, on-off.

22. The system of claim 15, wherein the coverage provided during the one or more coverage periods insures a market value of the particular property or interest, independent of any physical change to the particular property or interest.

23. The system of claim 15, wherein the two or more coverage periods provided are determined using the risk profiles so as to reduce the liability to the first insurer by limiting the exposure of the insurer to only the two or more coverage periods.

24. The system of claim 23, wherein the risk profiles are generated using data stored in the database relating to the liability exposure of the first insurer in the event of a catastrophic event.

25. The system of claim 15, wherein the two or more coverage periods of the first insurer are a plurality of coverage periods separated from one another by a period of non-coverage during the policy term.

26. The system of claim 25, wherein the occurrence of each of the plurality of coverage periods, and correspondingly, each period of non-coverage during the policy term is defined by a switching device.

27. The system of claim 26, wherein the switching device is at least one of on/off, odd/even and decimals/fractions.

28. A method for providing insurance coverage for a particular property or interest over a predefined policy period, comprising the steps of:
providing access to at least one database stored in a computer accessible memory device including information about the particular property or interest;
utilizing information in the at least one database to create, with a computer, risk profiles over time, relative to insuring the particular property or interest;
creating, by a computer, an insurance policy using the risk profiles, having a risk coverage for the particular property or interest distributed between two or more insurers, the insurance policy created defining:
two or more coverage periods in which insurance coverage is provided on the particular property or interest by a first insurer, the total duration of the two or more coverage periods being less than the first duration;
at least a third coverage period in which insurance coverage is provided on the particular property or interest by a second insurer, the at least a third coverage period of the second insurer being different than the two or more coverage periods of the first insurer; and
the insurance policy for the particular property or interest providing coverage by only the first insurer during the two or more coverage periods defined and by only the second insurer during the at least a third coverage period defined, at least two of the two or more coverage periods being non-contiguous in time during the first duration.

29. The method of claim 28, wherein the risk profiles created distribute risk coverage between the two or more insurers, such that each insurer provides only a fraction of the entire risk coverage on the particular property or interest during the policy period.

30. The method of claim 29, wherein the risk profiles created distribute risk coverage between the two or more insurers, such that each insurer provides risk coverage on the particular property or interest for only a portion of the predefined policy period less than the whole predetermined policy period.

31. The method of claim 30, wherein the two or more insurers, together, provide full risk coverage on the particular property or interest for the entire predefined policy period.

32. A method for providing insurance coverage for a plurality of properties or interests in a group that shares a common characteristic, comprising the steps of:
providing access to at least one database stored in a computer accessible memory device including information about a particular property or interest of the plurality of properties and of the common characteristic;
utilizing information in the at least one database to create, with a computer, risk profiles over time, relative to insuring the particular property or interest;
creating, by a computer, an insurance policy using the risk profiles, having a risk coverage for the particular property or interest distributed between two or more insurers based on a risk profile determined with regard to the common characteristic, the insurance policy created defining:
two or more coverage periods in which insurance coverage is provided on the particular property or interest by a first insurer, the total duration of the two or more coverage periods being less than the first duration;
at least a third coverage period in which insurance coverage is provided on the particular property or interest by a second insurer, the at least a third coverage period of the second insurer being different than the two or more coverage periods of the first insurer; and
the insurance policy for the particular property or interest providing coverage by only the first insurer during the two or more coverage periods defined and by only the second insurer during the at least a third coverage period defined, at least two of the two or more coverage periods being non-contiguous in time during the first duration.

33. The method of claim 32, wherein the coverage for the plurality of properties or interests is distributed between the two or more insurers, such that, at any one moment in time, no single insurer is providing full risk coverage for all of the plurality of properties or interests that share the common characteristic.

34. The method of claim 32, wherein the common characteristic shared by the plurality of properties or interests relates to a common geographic area.

* * * * *